US008778043B2

(12) United States Patent
Krisko et al.

(10) Patent No.: US 8,778,043 B2
(45) Date of Patent: *Jul. 15, 2014

(54) FILTER ELEMENTS; AIR CLEANER; ASSEMBLY; AND, METHODS

(75) Inventors: William J. Krisko, Bloomington, MN (US); Wayne R. W. Bishop, St. Louis Park, MN (US); Steven S. Gieseke, Richfield, MN (US); Benny Nelson, Waconia, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,205

(22) Filed: Jan. 23, 2012

(65) Prior Publication Data

US 2013/0019576 A1    Jan. 24, 2013

Related U.S. Application Data

(63) Continuation of application No. 12/692,114, filed on Jan. 22, 2010, now Pat. No. 8,101,003, which is a continuation of application No. 10/587,766, filed as application No. PCT/US2005/009813 on Mar. 23, 2005, now Pat. No. 7,674,308.

(60) Provisional application No. 60/556,133, filed on Mar. 24, 2004.

(51) Int. Cl.
*B01D 46/00* (2006.01)

(52) U.S. Cl.
USPC ............... 55/502; 55/385.3; 55/498; 55/501; 55/503; 55/521; 55/529

(58) Field of Classification Search
USPC ......... 55/385.3, 498, 501, 502, 503, 521, 529
See application file for complete search history.

(56) References Cited

U.S. PATENT DOCUMENTS

| 1,238,068 A | 8/1917 | Slater et al. |
| 2,064,207 A | 12/1936 | Jacobs |
| 2,559,604 A | 6/1952 | Bauer et al. |
| 2,890,796 A | 6/1959 | Blood |
| 3,025,963 A | 3/1962 | Bauer |

(Continued)

FOREIGN PATENT DOCUMENTS

| DE | 44 29 527 A1 | 10/1995 |
| DE | 102 22 800 A1 | 4/2003 |

(Continued)

OTHER PUBLICATIONS

Declaration of Wayne R.W. Bishop and Exhibits A-D (7 pages).

(Continued)

*Primary Examiner* — Robert Clemente
(74) *Attorney, Agent, or Firm* — Merchant & Gould, P.C.

(57) ABSTRACT

A filter cartridge, a safety element and fluid cleaner assembly are described. The fluid cleaner assembly generally includes a housing having a cover and a primary fluid cleaner section. The filter cartridge generally comprises z-filter media, arranged in a straight through configuration. Preferred cartridges include a seal gasket positioned to extend continuously around at outer perimeter of the straight through flow construction. The fluid cleaner assembly can have a precleaner positioned therein. Preferred features are described. Methods of assembly and use are also provided.

32 Claims, 17 Drawing Sheets

(56) References Cited

U.S. PATENT DOCUMENTS

| | | |
|---|---|---|
| 3,209,917 A | 10/1965 | Yelinek |
| 3,216,578 A | 11/1965 | Wright et al. |
| 3,397,518 A | 8/1968 | Rogers |
| 3,676,242 A | 7/1972 | Prentice |
| 3,695,012 A | 10/1972 | Rolland |
| 3,695,437 A | 10/1972 | Shaltis |
| 3,712,033 A | 1/1973 | Gronholz |
| 3,807,150 A | 4/1974 | Maracle |
| 3,841,953 A | 10/1974 | Lohkamp et al. |
| 3,849,241 A | 11/1974 | Butin et al. |
| 3,878,014 A | 4/1975 | Melead |
| 3,912,631 A | 10/1975 | Turman |
| 4,065,341 A | 12/1977 | Cub |
| 4,093,435 A | 6/1978 | Marron et al. |
| 4,187,091 A | 2/1980 | Durre et al. |
| 4,201,819 A | 5/1980 | Schenz |
| 4,242,115 A | 12/1980 | Harold et al. |
| 4,255,175 A | 3/1981 | Wilkins |
| 4,316,801 A | 2/1982 | Cooper |
| 4,322,231 A | 3/1982 | Hilzendeger et al. |
| 4,359,330 A | 11/1982 | Copley |
| 4,394,147 A | 7/1983 | Caddy et al. |
| 4,402,830 A | 9/1983 | Pall |
| 4,410,430 A | 10/1983 | Hagler, Jr. |
| 4,449,993 A | 5/1984 | Bergeron |
| 4,498,989 A | 2/1985 | Miyakawa et al. |
| 4,575,422 A | 3/1986 | Zimmer |
| 4,589,983 A | 5/1986 | Wydevan |
| RE32,185 E | 6/1986 | Copley |
| 4,617,122 A | 10/1986 | Kruse et al. |
| 4,673,503 A | 6/1987 | Fujimoto |
| 4,720,292 A | 1/1988 | Engel et al. |
| 4,746,340 A | 5/1988 | Durre et al. |
| 4,810,379 A | 3/1989 | Barrington |
| 4,963,171 A | 10/1990 | Osendorf |
| 4,997,466 A | 3/1991 | Hood |
| 5,069,790 A | 12/1991 | Mordecki |
| 5,125,941 A | 6/1992 | Ernst et al. |
| 5,211,846 A | 5/1993 | Kott et al. |
| 5,238,474 A | 8/1993 | Kahlbaugh et al. |
| 5,240,479 A | 8/1993 | Bachinski |
| 5,290,621 A | 3/1994 | Bach et al. |
| 5,304,312 A | 4/1994 | Forster et al. |
| 5,350,515 A | 9/1994 | Stark et al. |
| 5,415,677 A | 5/1995 | Ager et al. |
| 5,423,892 A | 6/1995 | Kahlbaugh et al. |
| 5,435,870 A | 7/1995 | Takagaki et al. |
| 5,443,891 A | 8/1995 | Bach |
| 5,472,379 A | 12/1995 | Andress et al. |
| 5,472,463 A | 12/1995 | Herman et al. |
| 5,484,466 A | 1/1996 | Brown et al. |
| 5,487,767 A | 1/1996 | Brown |
| 5,531,892 A | 7/1996 | Duffy |
| 5,536,290 A | 7/1996 | Stark et al. |
| 5,543,007 A | 8/1996 | Takagaki et al. |
| 5,547,480 A | 8/1996 | Coulonvaux |
| 5,569,311 A | 10/1996 | Oda et al. |
| 5,601,717 A | 2/1997 | Villette et al. |
| 5,613,992 A | 3/1997 | Engel |
| 5,620,505 A | 4/1997 | Koch et al. |
| 5,624,559 A | 4/1997 | Levin et al. |
| 5,667,545 A | 9/1997 | Honda et al. |
| 5,674,302 A | 10/1997 | Nakayama et al. |
| 5,679,122 A | 10/1997 | Moll et al. |
| 5,685,985 A | 11/1997 | Brown et al. |
| 5,714,126 A | 2/1998 | Frund |
| 5,720,790 A | 2/1998 | Kometani et al. |
| 5,730,766 A | 3/1998 | Clements |
| D396,098 S | 7/1998 | Gillingham et al. |
| 5,782,944 A | 7/1998 | Justice |
| 5,792,229 A | 8/1998 | Sassa et al. |
| 5,792,247 A | 8/1998 | Gillingham et al. |
| 5,795,361 A | 8/1998 | Lanier, Jr. et al. |
| D398,046 S | 9/1998 | Gillingham et al. |
| D399,944 S | 10/1998 | Gillingham et al. |
| 5,820,646 A | 10/1998 | Gillingham et al. |
| 5,846,495 A | 12/1998 | Whittenberger et al. |
| 5,871,557 A | 2/1999 | Tokar et al. |
| 5,895,574 A | 4/1999 | Friedmann et al. |
| 5,897,676 A | 4/1999 | Engel et al. |
| 5,897,787 A | 4/1999 | Keller |
| 5,902,361 A | 5/1999 | Pomplun et al. |
| 5,902,364 A | 5/1999 | Tokar et al. |
| 5,958,097 A | 9/1999 | Schlor et al. |
| D417,268 S | 11/1999 | Gillingham |
| 6,017,379 A | 1/2000 | Kaufman |
| D425,189 S | 5/2000 | Gillingham et al. |
| D428,128 S | 7/2000 | Gillingham et al. |
| 6,164,457 A | 12/2000 | Schlör |
| 6,179,890 B1 | 1/2001 | Ramos et al. |
| D437,402 S | 2/2001 | Gieseke et al. |
| 6,187,073 B1 | 2/2001 | Gieseke et al. |
| 6,190,432 B1 | 2/2001 | Gieseke et al. |
| D439,963 S | 4/2001 | Gieseke et al. |
| 6,221,122 B1 | 4/2001 | Gieseke et al. |
| 6,231,630 B1 | 5/2001 | Ernst et al. |
| 6,235,195 B1 | 5/2001 | Tokar |
| D444,219 S | 6/2001 | Gieseke et al. |
| D447,549 S | 9/2001 | Gieseke et al. |
| D450,827 S | 11/2001 | Gieseke et al. |
| D450,828 S | 11/2001 | Tokar |
| 6,348,084 B1 | 2/2002 | Gieseke et al. |
| 6,350,291 B1 | 2/2002 | Gieseke et al. |
| D455,483 S | 4/2002 | Gieseke et al. |
| 6,368,374 B1 | 4/2002 | Tokar et al. |
| 6,375,700 B1 | 4/2002 | Jaroszczyk et al. |
| 6,391,076 B1 | 5/2002 | Jaroszczyk et al. |
| D461,003 S | 7/2002 | Gieseke et al. |
| 6,416,561 B1 | 7/2002 | Kallsen et al. |
| D461,884 S | 8/2002 | Gieseke et al. |
| 6,447,567 B1 | 9/2002 | Ehrenberg |
| 6,482,247 B2 | 11/2002 | Jaroszczyk et al. |
| D466,602 S | 12/2002 | Gieseke et al. |
| 6,511,599 B2 | 1/2003 | Jaroszczyk et al. |
| 6,517,598 B2 | 2/2003 | Anderson et al. |
| 6,533,845 B2 | 3/2003 | Tokar et al. |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,641,637 B2 | 11/2003 | Kallsen et al. |
| 6,673,136 B2 | 1/2004 | Gillingham et al. |
| 6,706,087 B1 | 3/2004 | Gebler et al. |
| 6,743,317 B2 | 6/2004 | Wydeven |
| 6,746,518 B2 | 6/2004 | Gieseke |
| 6,783,565 B2 | 8/2004 | Gieseke et al. |
| 6,852,141 B2 | 2/2005 | Bishop et al. |
| 6,875,256 B2 | 4/2005 | Gillingham et al. |
| D506,539 S | 6/2005 | Bishop et al. |
| 6,908,494 B2 | 6/2005 | Gillingham et al. |
| 6,916,360 B2 | 7/2005 | Seguin et al. |
| 6,966,940 B2 | 11/2005 | Krisko et al. |
| 7,004,986 B2 | 2/2006 | Kopec et al. |
| 7,008,467 B2 | 3/2006 | Krisko et al. |
| 7,090,711 B2 | 8/2006 | Gillingham et al. |
| 7,318,851 B2 | 1/2008 | Brown et al. |
| 7,396,375 B2 | 7/2008 | Nepsund et al. |
| 7,491,254 B2 | 2/2009 | Krisko et al. |
| 7,520,913 B2 | 4/2009 | Mills et al. |
| 7,674,308 B2 | 3/2010 | Krisko et al. |
| 8,101,003 B2 * | 1/2012 | Krisko et al. .................. 55/502 |
| 2002/0185007 A1 | 12/2002 | Xu et al. |
| 2002/0189457 A1 | 12/2002 | Dallas et al. |
| 2003/0146149 A1 | 8/2003 | Binder et al. |
| 2003/0154863 A1 | 8/2003 | Tokar et al. |
| 2003/0217534 A1 * | 11/2003 | Krisko et al. .................. 55/337 |
| 2004/0040271 A1 | 3/2004 | Kopec et al. |
| 2004/0060861 A1 | 4/2004 | Winter et al. |
| 2004/0255781 A1 | 12/2004 | Tokar et al. |
| 2006/0090434 A1 | 5/2006 | Brown et al. |
| 2006/0091061 A1 | 5/2006 | Brown |
| 2006/0091064 A1 | 5/2006 | Brown et al. |
| 2006/0091066 A1 | 5/2006 | Driml et al. |
| 2006/0091084 A1 | 5/2006 | Merritt et al. |

(56) References Cited

U.S. PATENT DOCUMENTS

| | | |
|---|---|---|
| 2006/0123990 A1 | 6/2006 | Tokar et al. |
| 2006/0137316 A1 | 6/2006 | Krull et al. |
| 2007/0186774 A1 | 8/2007 | Gillingham et al. |
| 2007/0193236 A1 | 8/2007 | Merritt |
| 2007/0209343 A1 | 9/2007 | Cuvelier |
| 2008/0060329 A1 | 3/2008 | Brown et al. |
| 2009/0199520 A1 | 8/2009 | Mills et al. |
| 2010/0107577 A1 | 5/2010 | Krisko et al. |
| 2010/0115897 A1 | 5/2010 | Krisko et al. |
| 2010/0186353 A1 | 7/2010 | Ackermann et al. |

FOREIGN PATENT DOCUMENTS

| | | |
|---|---|---|
| EP | 0726389 | 8/1996 |
| EP | 1 306 117 A1 | 5/2003 |
| EP | 1364695 | 11/2003 |
| FR | 2 382 258 | 9/1978 |
| GB | 945 065 | 12/1963 |
| GB | 1 284 403 | 8/1972 |
| GB | 2 106 634 A | 4/1983 |
| JP | 59-170669 | 11/1984 |
| JP | S60-112320 | 7/1985 |
| JP | S60-124622 | 8/1985 |
| JP | 60-155921 | 10/1985 |
| JP | 63-122617 | 6/1988 |
| JP | 63-33612 | 9/1988 |
| JP | 1-11971 | 4/1989 |
| JP | 1-171615 | 7/1989 |
| JP | 2-9858 | 3/1990 |
| JP | Hei-2-31131 | 8/1990 |
| JP | 2-129233 | 10/1990 |
| JP | 8-28376 | 1/1996 |
| JP | 9-234321 | 9/1997 |
| WO | WO 89/01818 | 3/1989 |
| WO | WO 97/40918 | 11/1997 |
| WO | WO 01 34270 | 5/2001 |
| WO | WO 03/084641 | 10/2003 |
| WO | WO 2004/020075 | 3/2004 |
| WO | WO 2005/037408 A1 | 4/2005 |
| WO | WO 2005/107924 A2 | 11/2005 |
| WO | WO 2008/067029 A1 | 6/2008 |

OTHER PUBLICATIONS

Jaroszczyk et al.; Recent Advances in Engine Air Cleaners Design and Evaluation; 2004; vol. 11, No. 1-2 pp. 259-275.

Thomas G. Miller; Statement Regarding Product; Dec. 23, 2010; 7 pages.

Thomas G. Miller; Statement Regarding Product; Dec. 23, 2010; 10 pages.

European Search Report for Application No. 13 16 1605.4 mailed Dec. 4, 2013.

European Search Report for Application No. 13153716.9 mailed Sep. 2, 2013.

\* cited by examiner

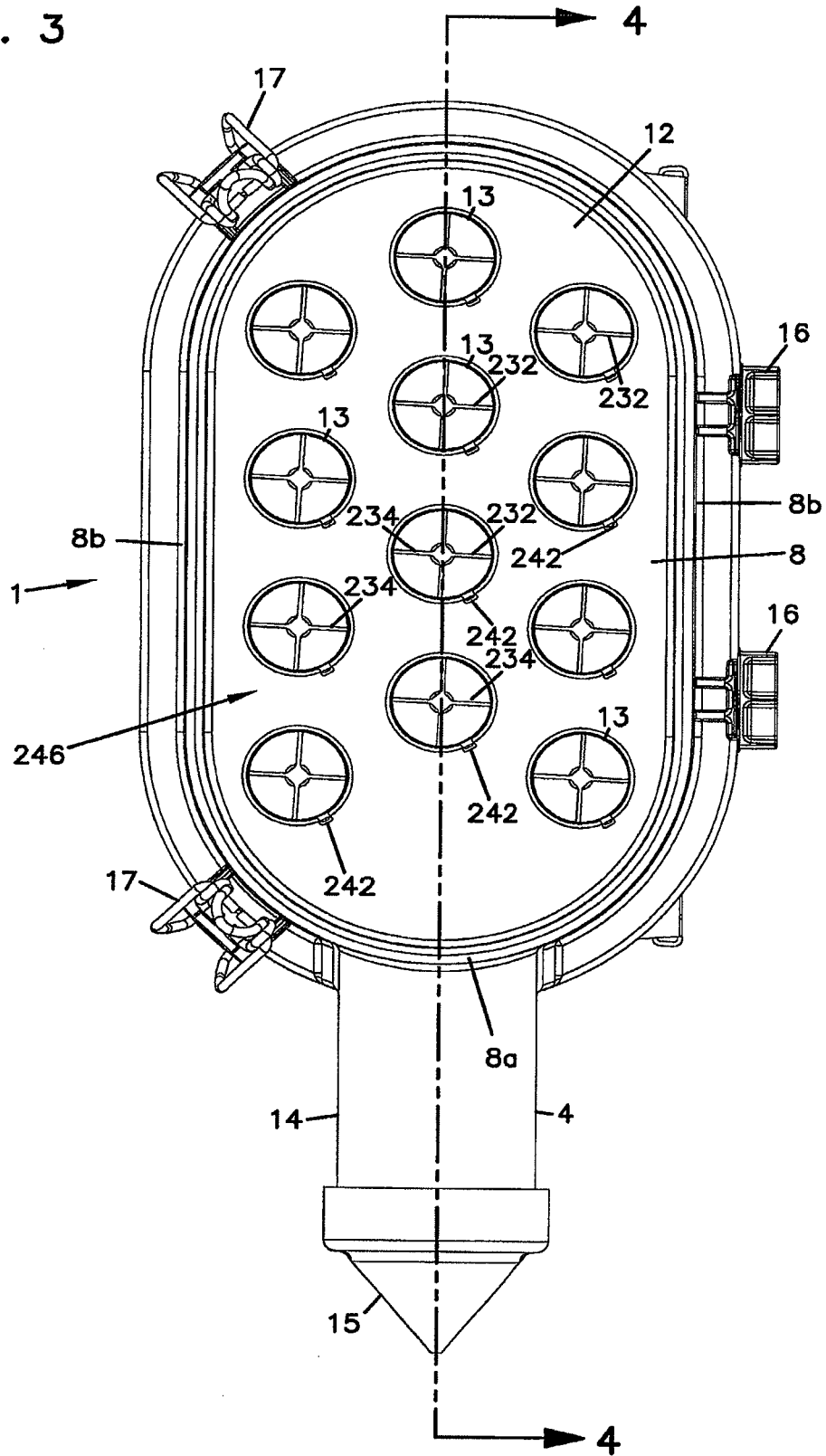

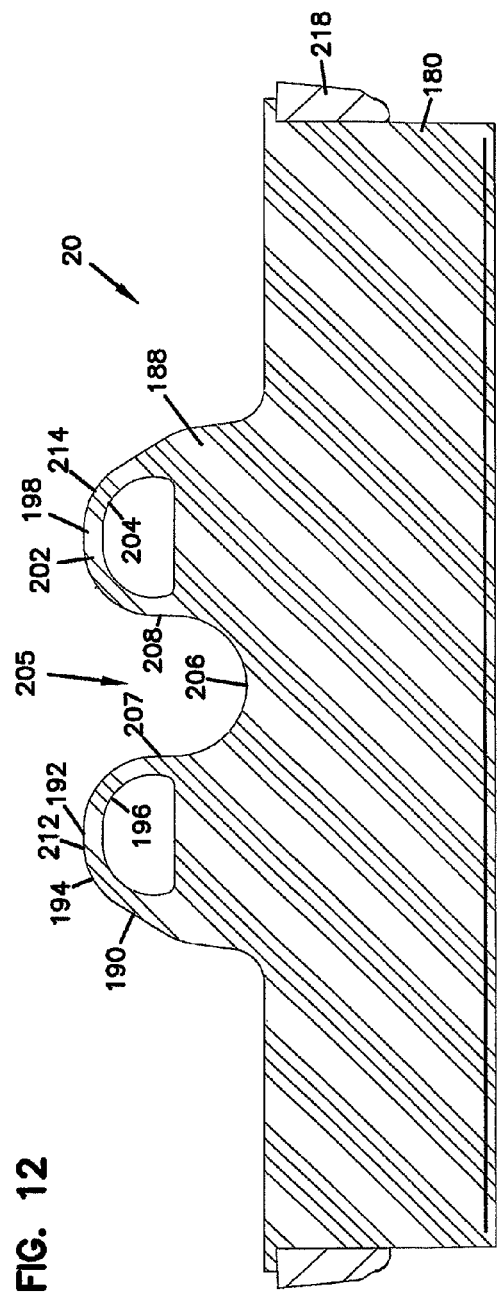
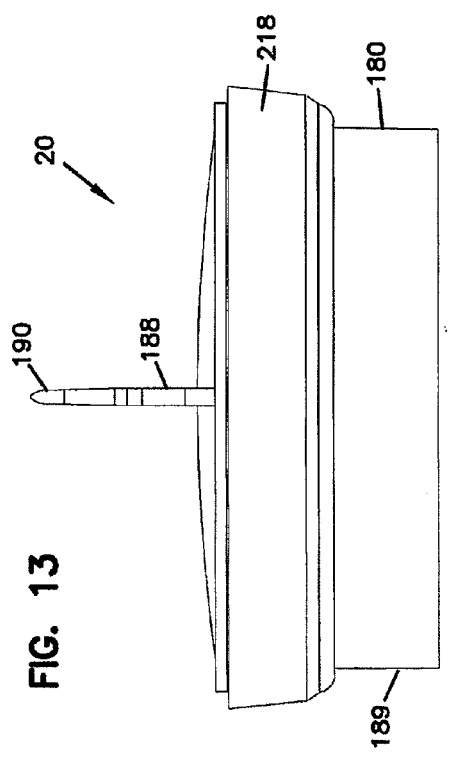
FIG. 12
FIG. 13

FILTER ELEMENTS; AIR CLEANER; ASSEMBLY; AND, METHODS

This application is a continuation of U.S. Ser. No. 12/692,114, filed Jan. 22, 2010, which issued as U.S. Pat. No. 8,101,003 on Jan. 24, 2012. U.S. Ser. No. 12/692,114 is a continuation of U.S. Ser. No. 10/587,766, filed 14 May 2007, which issued as U.S. Pat. No. 7,674,308 on Mar. 9, 2010. U.S. Ser. No. 10/587,766 is a National Stage application of PCT/US2005/009813, filed 23 Mar. 2005, which claims benefit of U.S. Provisional Patent Application Ser. No. 60/556,113, filed Mar. 24, 2004. U.S. Ser. Nos. 12/692,114, 10/587,766, and 60/556,113 are incorporated herein by reference. To the extent appropriate, a claim of priority is made to each of the applications.

TECHNICAL FIELD

The present disclosure relates to filter constructions for filtering fluids, such as liquids or gases. This particular disclosure concerns: straight through flow filter cartridges; safety filters; assemblies employing such filters; precleaners; and methods for use of, and assembly of, filter cartridges.

BACKGROUND

Straight through flow filters (filter elements or filter cartridges) have been used in various systems for filtering fluids such as gases or liquids. Straight through flow filters typically have an inlet face (or end) and an oppositely disposed outlet face (or end). During filtering, the fluid to be filtered flows in one direction upon entering the filter at the inlet face, and has the same general direction of flow as it exists the outlet face. Typically, a straight through flow filter is installed in a housing, for use. After a period of use, the filter requires servicing, either through cleaning or complete replacement of the filter. A seal is necessary between the filter and a portion of the housing in which the filter is placed in use, to ensure proper filtering of the fluid flow through the arrangement.

Improvements in straight through flow filters, their assembly and their use are desirable.

SUMMARY

According to the present disclosure a filter element or cartridge is provided. The filter element or cartridge in general has a straight through flow construction and comprises z-filter media. The filter element or cartridge includes a seal gasket.

A particular type of air filter cartridge is of concern, to the present disclosure. In general the air filter cartridge comprises: a z-filter media pack; a preform having a portion circumscribing the media pack, the preform including a housing seal support portion; and, a housing seal arrangement. The housing seal arrangement generally includes: a housing seal portion secured to the housing seal support; and, a media pack sealing portion circumscribing the media pack and sealing the preform to the media pack. Preferably the media pack sealing portion is (molded) integral with the housing seal portion. Also, preferably, the housing seal support portion includes a plurality of apertures therethrough; and, the housing seal arrangement includes a seal material extending through the seal apertures to mechanically secure the seal material to the preform.

In a particular form presently disclosed techniques, a coiled z-filter media pack is positioned inside of a preform. The preform includes an outer side wall shell, an end grid in a core secured to the end grid and projecting internally into the z-filter media pack, partway. Construction of this arrangement involves inserting the coiled media pack into the preform, causing the core to push into the media pack. As indicated, the core does not project completely through the media pack, but rather typically and preferably no more than 75% through the axial length of the media pack, usually no more than 60%. An end of the media pack opposite the end into which the core projects, preferably the media pack has no central core. Preferred securing of the media pack to the preform would be as characterized above.

Methods of preparing such filter cartridges are provided.

The features, techniques and principles disclosed can be applied to a variety of filter cartridges for a variety of uses. In the drawings, a system is disclosed utilizing a preferred filter cartridge according to the principles generally characterized above is provided, with the remainder of the system generally according to many of the principles in PCT application of Apr. 3, 2003 (PCT/US 03/10258, claiming priority to U.S. 60/370,438, filed Apr. 4, 2002; 60/426,071, filed Nov. 12, 2003; and Ser. No. 10/405,432, filed Apr. 2, 2003), the complete disclosures of all four which are incorporated herein by reference.

Herein, a variety of features, arrangements and techniques are provided, that can be incorporated into air cleaner arrangements, to advantage. Selected ones of the techniques features arrangements can be utilized, to advantage. Together, a particularly preferred arrangement is provided. However, it is not a requirement that all filter elements or assemblies must incorporate all advantageous features herein, to obtain benefit and advantage according to the present disclosure. The individual features, techniques and advantages can be selected and be selectively combined, for various alternate arrangements.

BRIEF DESCRIPTION OF THE DRAWINGS

FIG. 3 is an inlet end view of the air cleaner arrangement depicted in FIG. 1;

FIG. 6 being taken toward an inlet face.

FIG. 9A being taken toward the end of the preform indicated at reference numeral 61, FIG. 9;

FIG. 12 is a longitudinal cross-sectional view of the safety filter depicted in FIG. 11;

FIG. 13 is an end view of the safety filter of FIG. 11;

DETAILED DESCRIPTION

A. Overview

The principles herein generally are preferred features for serviceable filter cartridges. The serviceable filter cartridges can be used in a variety of arrangements, typically as primary air filter cartridges for air cleaners. The term "serviceable" in this context, is meant to refer to a filter cartridge which after a period of use is removed and replaced, with respect to the air cleaner. The term "primary" in this context is meant to refer to the filter cartridge on which a majority of dust or other contaminant which passes through filter media in the air cleaner, is loaded.

In general, the features, techniques and principles disclosed herein with respect to filter cartridges can be applied in a variety of assemblies and arrangements. The particular arrangement depicted is a filter cartridge useable, for example, in a two-stage air cleaner, the air cleaner generally being of the type generally described in PCT publication WO 03/08464, referenced above. For this reason, other general features of the air cleaner are described in detail. Further the overall air cleaner is enhanced, by utilization of filter cartridge according to the present preferred configuration.

B. Review of the Assembly of FIGS. 1-4

In general, the techniques described herein are applicable to fluid cleaners. There are generally two classes of fluid cleaners with which the techniques can be applied, namely liquid cleaners and gas cleaners. The embodiment depicted is specifically of an air cleaner (i.e., a type of gas cleaner), and thus the features will be described in this context. Applicability of the principles and techniques described to liquid cleaners or to cleaners of other gases, will be apparent from the general descriptions.

Figure 1:
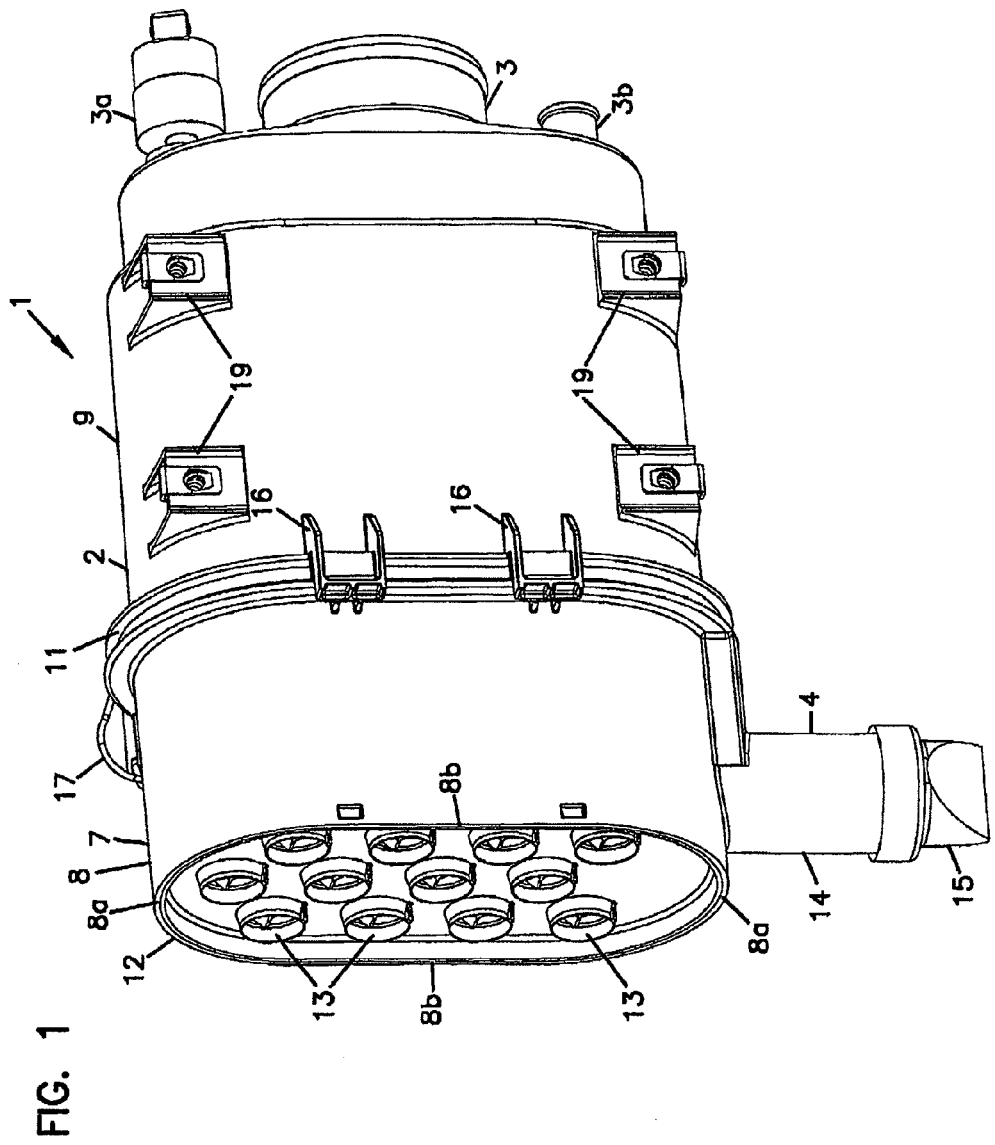
FIG. 1 is a side perspective view of an air cleaner arrangement according to the present disclosure.

Reference numeral 1, FIG. 1, indicates an air cleaner arrangement. The particular air cleaner 1 depicted is a two-stage air cleaner comprising: a housing 2, an outlet flow duct 3, and a dust ejector 4. In general, the air cleaner arrangement 1 also includes, within the housing 2, as described below, a serviceable (primary) filter cartridge (element) and an optional, serviceable safety (or secondary) filter cartridge (element). Herein the term "primary" when used to refer to a filter cartridge or element, is meant to refer to a filter cartridge which conducts majority of the filtering that occurs by passage of air through media within the assembly. In this instance by "filtering" what is meant is removal of particulate material by passage of fluid flow through media. The term "serviceable" in this context is meant to refer to a filter cartridge that is configured to be periodically removed and replaced. (That is, the air cleaner can be serviced by removing one filter cartridge and installing another.) A safety cartridge or secondary cartridge (or element) helps to protect downstream components of the equipment on which the air cleaner assembly 1 is installed, for example in case of failure of the primary filter cartridge or during servicing of the primary filter cartridge.

Herein above, it was stated that the particular air cleaner 1 depicted is a two-stage air cleaner. By this it is meant that there was a precleaner stage present, upstream of the serviceable primary filter cartridge. There is provided equipment that causes a first stage removal of dust or other componentry, prior to the air reaching the primary filter cartridge. The upstream component is generally a precleaner which operates without passage of the air through media, but rather uses a cyclonic or centrifugal approach to dust separation.

Still referring to FIG. 1, in general the air cleaner 1 depicted is a preferred two-stage air cleaner having a cover 7, in this instance a precleaner section 8, and a primary air cleaner section 9. The particular housing 2 depicted is jointed between the cover 7 and the primary air cleaner section 9, at joint or region 11. At housing joint 11, the cover 7 and the primary air cleaner section 9 can be opened or separated, for access to an internally received filter cartridge, for servicing. Herein a step of pivoting, or in some instances even removing, a housing cover 7 relative to the primary filter cartridge containing section 9, will be referred to as a step of obtaining service access to an internally-received filter element component, or alternatively as "opening" the air cleaner 1, for example for servicing.

In general, air to be filtered enters air cleaner assembly 1 at inlet end 12, by passage into individual cyclonic or centrifugal separators 13, in precleaner 8. Separators of the type usable at reference 13 could be conventional, and a variety of types may be used, for example those in U.S. Pat. Nos. 4,242,115 and 4,746,340, both of which are incorporated herein by reference.

The particular precleaner 8 shown can lead to advantages. Within the separators 13, a first stage dust separation or precleaning occurs, and dust separated at this location is ejected from the precleaner 8 through dust ejector 4, in particular through ejector tube 14 and ejector valve 15. Of course, the process conducted in the precleaner 8 is not "filtering" as the term was defined above, since the dust separation in the precleaner results from a centrifugal or cyclonic process, as opposed to a process of passing the fluid through a media. The particular precleaner 8 shown is described in more detail below.

As an alternative, in place of a precleaner that uses a plurality of individual cyclonic or centrifugal separators 13, a precleaner arrangement generally as characterized in U.S. provisional application 60/512,109, filed Oct. 17, 2003, can be used. The complete disclosure of the 60/512,109 application is incorporated herein by reference.

Air that is passed out of the precleaner 8, into the primary air cleaner section 9, is then passed: (a) first through an internally received primary filter cartridge, described in Section C below; and (b) next through (optional) safety element (described in Section D below), and eventually into a clean air region for exiting air cleaner 1 through clean air outlet duct 3. From duct 3, the clean air can be directed to whatever equipment is downstream, for example an engine air intake of an internal combustion engine or a turbocharger.

Figure 2:
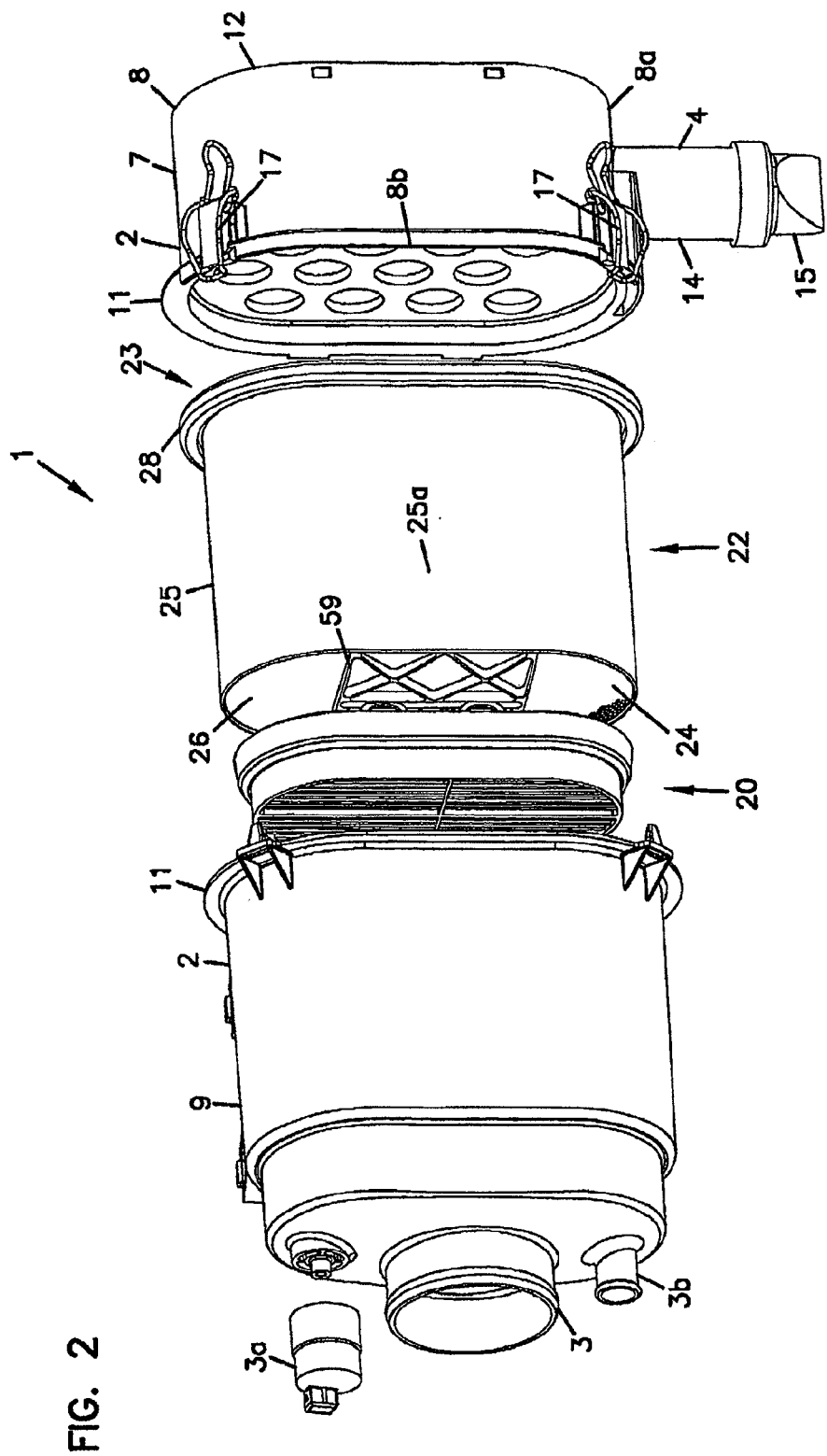
FIG. 2 is an exploded, perspective view of the air cleaner arrangement depicted in FIG. 1, the precleaner, primary filter, and safety filter being viewable.

Referring to FIGS. 1 and 2, in general cover 7 is pivotally secured on primary air cleaner section 9 by supports 16 and over center clamps 17. Once the over center clamps 17 are released, the cover 7 can be opened relative to the primary air cleaner section 9 of housing 2, by pivoting the cover 7 (or precleaner 8) relative to the supports 16. Alternately, the system can be configured for complete separation of the cover 7 during opening. (It is noted that in FIG. 2A, the over center clamps are not shown, but mounts 17a for them are.)

Referring to FIG. 1, the assembly 1 can be mounted on various machinery parts by mounting pads 19, for example using bolts. In general, air cleaner 1 will be mounted with ejector tube 14 and dust ejector 15 directed generally downwardly, to facilitate dust ejection. The mounting pads 19 are shown in an example location. The specific type and location of mounting pads will depend on the equipment to which the air cleaner 1 is to be mounted, and the preference for accomplishing the downward direction of the ejector tube 14 and dust ejector 15. The relative location of the ejector tube 14, around a perimeter of the precleaner 8, is also a function of how the air cleaner 1 is to be mounted in use. The particular location shown, at one of the (opposite) narrower curved ends 8a of the precleaner 8, instead of one of the (opposite) sides 8b is convenient for many assemblies using principles according to the present disclosure.

Still referring to FIG. 1, the air cleaner 1 may include a pressure indicator 3a and a connector 3b adjacent outlet 3, for conventional use. The connector 3b can provide, for example, for filtered air flow to a crank case ventilation system.

Figure 16:
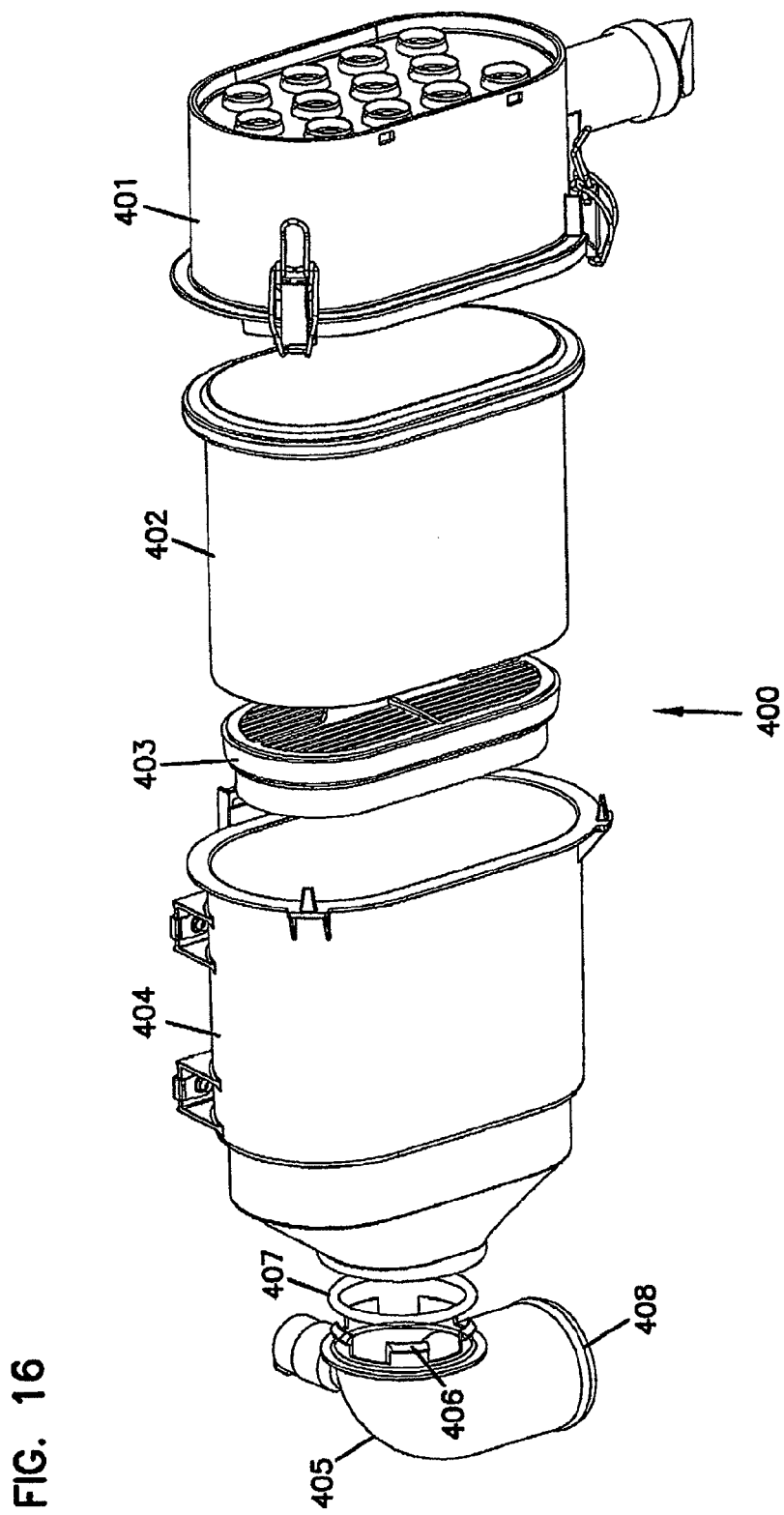
FIG. 16 is an exploded view of a second embodiment.

Referring still to FIG. 1, outlet 3 is a fixed stationary outlet. Alternatives are possible. With respect to this, attention is directed to FIG. 16 in which an exploded view of an alternate embodiment 400 is depicted. Air cleaner 400 comprises precleaner 401, primary filter element 402, optional safety element 403, housing section 404 and outlet 405. The outlet 405 is swivel or pivotal piece, mounted with a snap-fit at 406 and a swivel ring 407. Thus, it can be pivoted on housing 405 for outlet end 408 to be directed in a variety of directions.

The other components 401, 402, 403 and 404, may be analogous to the same components as described in connection with the other figures.

Figure 4:
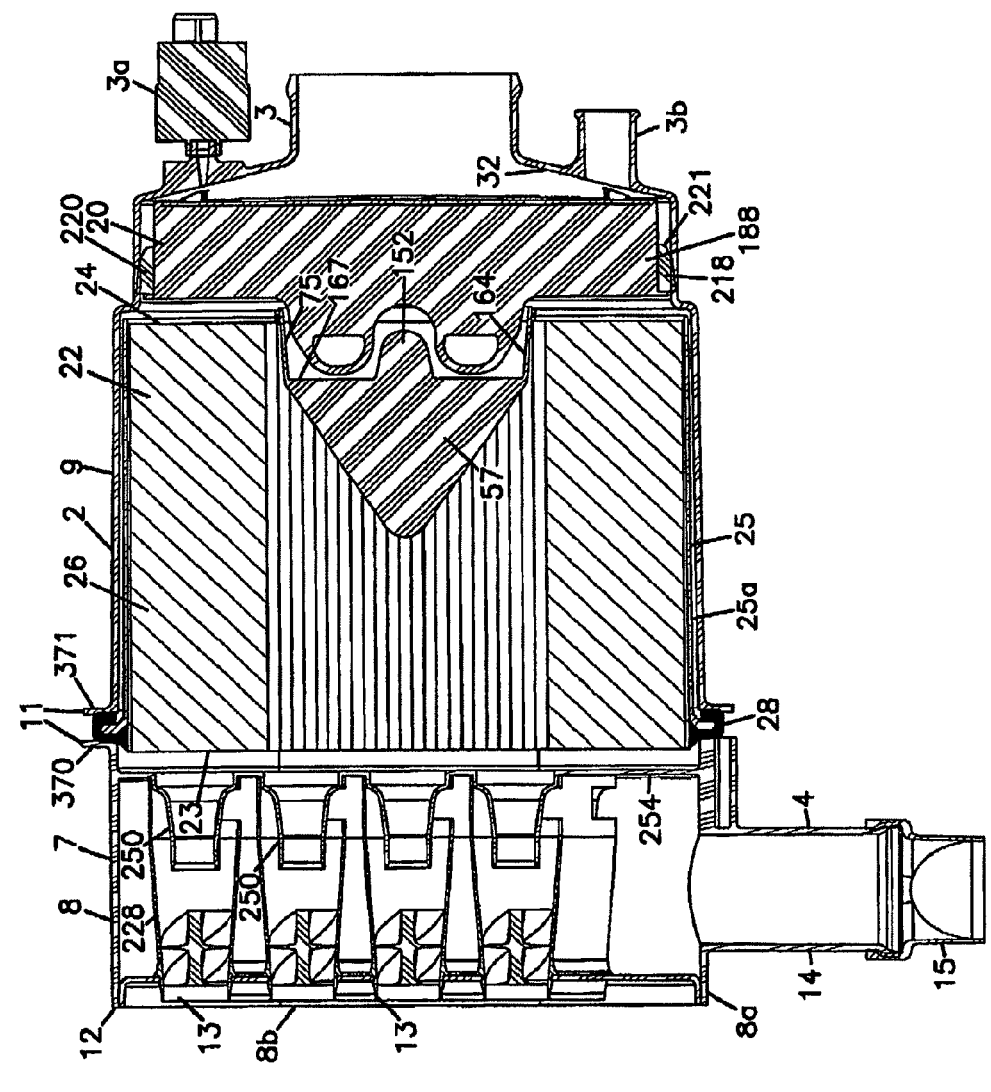
FIG. 4 is a cross-sectional view of the air cleaner arrangement depicted in FIG. 1, the cross-section being taken generally along the line 4-4 of FIG. 3.

Attention is now directed to FIG. 4, which is a fragmentary cross-sectional view of the assembly 1 depicted from the view point of line 4-4, FIG. 3. Referring to FIG. 4, precleaner 8 is shown mounted on primary air cleaner section 9, with internally received primary filter cartridge 22 depicted and with optional internally received safety filter 20 depicted.

C. A Preferred Primary Filter Cartridge

Referring to FIG. 2, the filter cartridge 22 is configured to permit straight through flow; that is, it has a straight through flow construction. By the term "straight through flow," in this context, it is meant that the fluids which flow to the filter cartridge 22, for filtering, enter filter media 26 of the filter cartridge 22 at inlet end or face 23 in a first direction and exit from opposite outlet end or face 24 with flow in the same general direction. The term "straight through flow" as characterized above, is meant to specifically differentiate a flow in a system such as that described in WO 89/01818 published 9 Mar. 1989, in which air enters a cylindrical pleated filter member by direction against a cylindrical surface, and then exits the element (for example through an aperture) after making an approximately 90° turn.

The filter cartridge 22 has an outer sidewall or surface 25 with a filter media pack 26 that is configured to filter particulates from a gas stream entering the inlet end or face 23, such that the gas stream exiting the outlet end or face 24 is at least partially clean (i.e., free of particulates). As can be seen from FIG. 2, the filter cartridge 22 includes a housing gasket or housing seal 28 which aids in inhibiting leakage between the filter cartridge 22 and portions of the housing 2 in which the filter cartridge 22 is installed. The preferred gasket 28 extends completely, peripherally, around the outer sidewall 25 of the straight through flow construction or cartridge 22.

As will be discussed further below, for the preferred arrangements the outer side wall or surface 25 is formed by a preformed piece (preferably a preformed molded plastic piece) or preform 25a: (a) inside of which filter media pack 26 is positioned, (b) to which the filter media pack 26 is sealed; and, (c) on which the housing seal 28 is secured. This preform 25a, is discussed in greater detail below, in connection with the description of FIGS. 6-7A and 9-9C at 60. The preform or preformed piece 25a, is sometimes referred to herein as a "shell," or as an "element housing." It should not be confused with the air cleaner housing 2. Indeed, in use, the particular preform 25a shown is positioned to secure the media pack 25 inside of air cleaner housing 2, with housing seal 28 secured between housing portions, as discussed below in connection with FIG. 8.

Preferred filter media packs 26 usable in the primary element 22 of air cleaner arrangement 1 uses a type of media, described below, generally referred to as "z-media" or "z-filter media." Z-filter media generally comprises a fluted (typically corrugated or pleated) media sheet secured to a facing sheet. Typically, the facing sheet for z-filter media is a non-fluted, non-corrugated sheet. In some instances a sheet having corrugations extending perpendicularly to the flutes of the fluted sheet can be used, see for example the disclosure of U.S. provisional 60/543,702, filed Feb. 10, 2004 and U.S. provisional 60/543,804, filed Feb. 11, 2004, both of which are incorporated herein by reference.

In general, z-filter media is arranged to form a set of longitudinal (axial) flutes or air flow channels on one side of the corrugated or fluted media, and another set of longitudinal (axial) flow channels on an opposite side of the fluted media. The term "axial" in connection with the definition of the longitudinal flutes, is meant to refer to a direction of flute extensions generally between the opposite faces 23, 24 of the media pack 26, typically referred to as the axial direction.

In operation, flutes of one set of flutes: are designated as inlet flutes; are left open at an inlet end side, edge or face of the media; and, are sealed or otherwise folded closed at an outlet end, side, edge or face of the media. Analogously, the flutes of a second set of flutes: are generally designated as outlet flutes; are sealed or otherwise closed at the inlet end side, edge or face of the filter; and, are left open at the outlet end side, edge or face of the media. In operation, air passes into the inlet flow face 23 of the media pack 26 by passage into the open inlet flutes at an upstream end or face of the filter cartridge 22. The air cannot flow out of the closed ends of these inlet flutes, so it must pass through the filter media into the outlet flutes. The filtered air then passes outwardly from an exit end 24 of the filter media pack 26, through the open ends of the outlet flutes.

A variety of shapes, i.e., outer perimeter configurations, for the primary filter cartridge 22 can be used. The particular one used the arrangement of the drawings, is an "obround" shape. The term "obround" as used herein, is generally meant to refer to an arrangement that is not circular in a perimeter shape of a cross-section; the referenced cross-section being taken perpendicularly to a direction of extension of the flutes, again sometimes referenced as the axial direction. (Of course, many of the techniques described herein can be applied to elements that have a circular perimeter shape or cross-section.) A variety of obround shapes are possible including, for example, oval and racetrack. In general both of these example obround shapes can generally be characterized as having two opposite curved ends with sides extending therebetween. A "racetrack shape" generally has opposite parallel sides extending between the two, opposite, curved ends. An oval shape generally has a slight curvature to the opposite sides, typically with the opposite sides positioned as mirror images to one another.

The particular filter cartridge 22 depicted, has a generally obround shape to both a cross-section of the outer preform or shell 25a and a cross-section of the media pack 26, as will be apparent from the following descriptions. Typically the ends (of the cross-sectional shape) of the obround configuration are each semi-circular.

Figure 5:
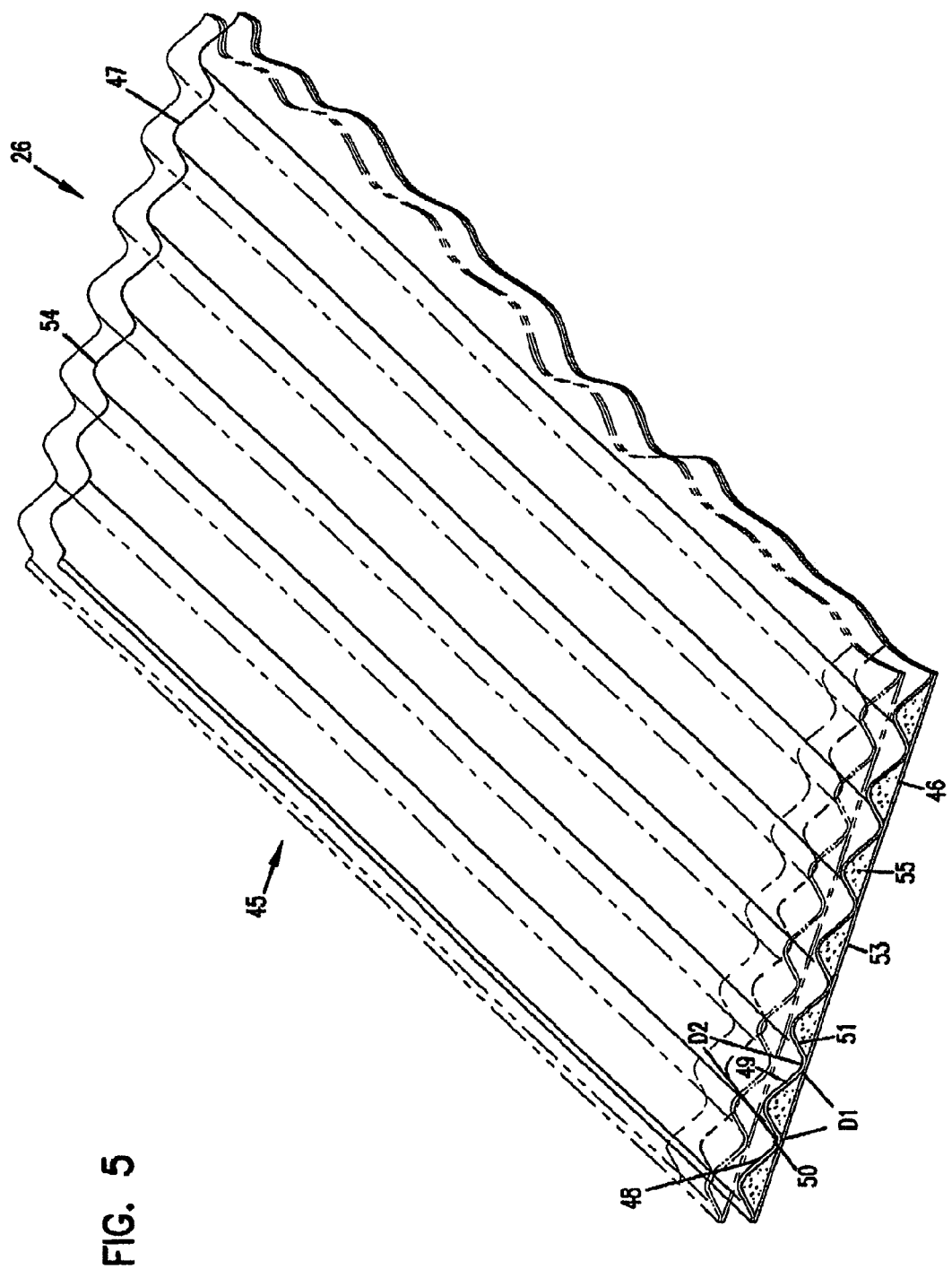
FIG. 5 is a schematic, perspective view of z-filter media; a type of media preferably used in the primary filter cartridge of FIG. 2.

Referring to FIG. 5, in general the filter media pack 26 is made from a two-layered construction 45, formed from a facing sheet 46 secured to a fluted, in this instance corrugated, sheet 47. Typically, the media pack is a coiled arrangement and the coiling is conducted with the facing sheet 46 directed to the outside, and the corrugated sheet 47 directed inwardly. For the particular filter media pack 26 depicted, FIG. 5, the facing sheet 46 is a non-corrugated, non-fluted shape. In the alternative a sheet corrugated perpendicularly to the direction of the flutes of the fluted sheet 47, can be used in some instances.

Media comprising strips of two-layered construction 45 formed from a facing sheet 46 secured to a fluted corrugated sheet 47, can also be formed into a media pack by stacking the strips on one another, with an appropriate sealant bead therebetween. Such arrangements are generally referred to as "stacked z-filter media." The principles described herein can be applied to a stacked arrangement, however the embodiment shown is particularly well adapted for use with coiled arrangements.

In general, on one side 48 of the fluted sheet 47 a first set of flutes 49 is formed; and on an opposite second side 50, a second set of flutes 51 is formed. In FIG. 5, edge 53 would correspond to inlet face 23, FIG. 2; and, edge 54 would correspond to outlet face 24, FIG. 2. The phantom lines in FIG. 5, indicate coiling of the two-layered construction 45 around itself. The solid lines indicate an outer layer of the two layers depicted, resulting from the coiling.

In use, the first set of flutes 49 are closed adjacent an edge 54; and, the second set of flutes 51 are closed adjacent to opposite edge 53. Generally when it is said that the flutes are closed "adjacent" an edge, it is meant that they are sealed along the edge or at a position spaced from the edge, but generally positioned near the edge. When it is stated that the flutes are "sealed" when "closed" it is meant that they are either sealed by an applied sealant, or they are otherwise distorted closed, to inhibit passage of unfiltered liquid through the ends. A variety of techniques for sealing can be used. Typically a sealant 55 is used. A sealant can be applied as a continuous strip, between the fluted sheet 47 and the facing sheet 46. The flutes can be distorted (for example darted), in the vicinity of one or both of the ends, to advantage. Other techniques of sealing, not involving sealant, can be applied. Useable techniques of flute end sealing include those described in PCT/US03/02799, filed Jan. 31, 2003, U.S. provisional applications 60/455,643, filed Mar. 18, 2003; 60/466,026, filed Apr. 25, 2003; and 60/467,521, filed May 2, 2003; and PCT application filed Mar. 17, 2004, under Express Mail #EV 408495263 US and under title "Improved Process and Materials for Coiling Z-Filter Media, and/or Closing Flutes of Filter Media; and, Products", all of which are incorporated herein by reference.

Figure 7:
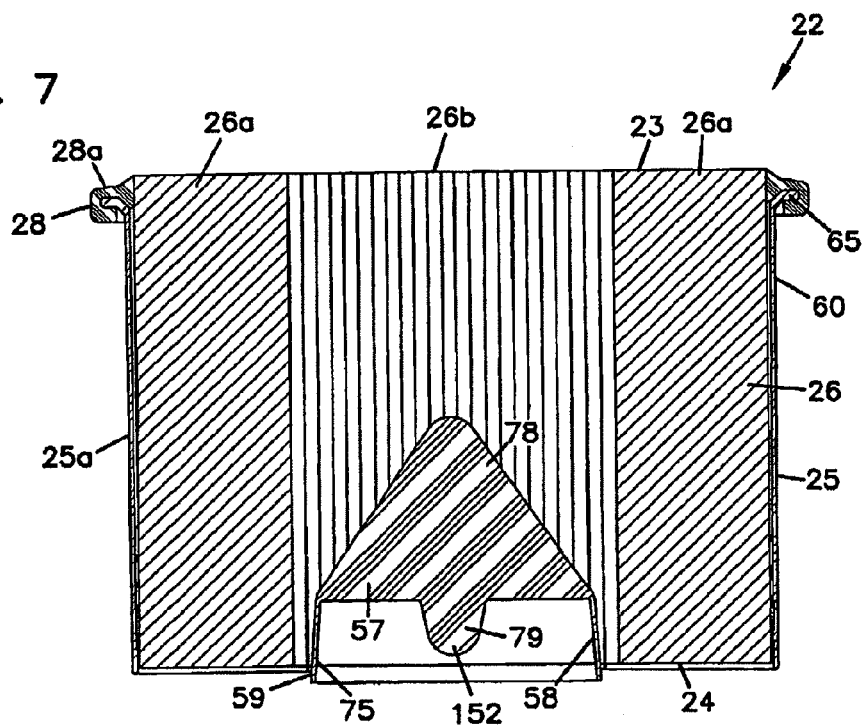
FIG. 7 is a cross-sectional view of the primary filter cartridge of FIG. 6, the cross-section being taken along the line 7-7 of FIG. 6.

From review of FIGS. 2 and 5, it should be apparent how the media 26 functions. In general, flutes of the first set of flutes 49 are open at inlet face 23, and thus comprise inlet flutes. They would be closed at their exit ends 54, as a result of a sealant bead or similar closure at this location. Thus, air which enters flutes of flute set 49 at the inlet edge 53 must pass through the media 26 to escape from the inlet flutes. Upon passage through the media: filtering occurs; and, air flow enters a second set of (outlet) flutes 51, at a location downstream from the sealant 53. Flutes of the outlet set of flutes 51 are open along edge 54, and thus the filtered fluid stream can flow out of the media 26. This type of construction is generally characterized herein as z-filter media. The z-filter media generally includes a plurality of flutes; each of having an upstream portion adjacent to an inlet flow face and a downstream portion adjacent to an outlet flow face; selected ones of the flutes being open at the upstream portion and closed at the downstream portion; and, selected ones of the flutes being closed at the upstream portion and open at the downstream portion. The inlet and outlet flow faces are not required to be planar, however that is a typical shape, as shown in FIGS. 4 and 7.

A variety of corrugation shapes and sizes can be utilized in the filter media 26. Examples include: corrugations resulting in a straight flutes, in which the flutes are parallel to each other and do not change shape from one end to other; straight flutes having crushed or pinched ends; and tapered flutes, in which inlet flutes gradually converge from a wide end in direction to a narrow end with adjacent exit flutes diverging from a narrow end to a wide end, in the same direction. Some examples of useable z-filter media configurations are described in the following references:

1. Standard flutes are depicted in U.S. Pat. No. 5,820,646; and U.S. Pat. No. 5,895,574.
2. Tapered flutes, flutes with crushed ends and other variations in flute shapes are described in WO 97/40918, published Nov. 6, 1997.

The complete disclosures of above references (i.e., U.S. Pat. Nos. 5,820,646; 5,895,524 and WO 97/40918) are incorporated herein by reference.

In general, when the media pack 26 comprises a coiled media, the coiling is of a media strip sometimes referred to as a "single facer" comprising the fluted media sheet 47 secured to the facing sheet 46, by a sealant bead positioned between the two. The sealant bead positioned between the fluted sheet 47 and facing sheet 46 of the single facer or media combination 45 is generally referred to herein as the single facer bead or sealant. Typically when the resulting media combination 45 is coiled, to form the coiled media pack 26, it is coiled: with the facing sheet 46 directed outwardly; and, with a second bead of sealant positioned adjacent an opposite end of the flutes from the single facer bead, along an opposite side of the facing sheet from the single facer bead. This second bead is typically referred to as a "winding bead," since: (a) it is formed generally immediately prior to coiling or winding of the media combination 45; and (b) its sealing function is provided as a result of the winding.

When the media pack 26 is formed by coiling the media configuration 45 with a winding bead thereon, a region of sealant from the winding bead is generally positioned toward an inside of the wind. The media can then be compressed at this region, sealing opposite sides of the winding bead material in this location together, to advantage. This is described for example in U.S. provisional application 60/467,521, filed May 2, 2003, incorporated herein by reference. It is also described in the 60/467,521 application, that a urethane material can be used to advantage at this location. The 60/467,521 disclosure was filed as part of a PCT application on Mar. 17, 2004, under Express Mail #EV 408495263 US and under title "Improved Process and Materials for Coiling Z-Filter Media, and/or Closing Flutes of Filter Media; and, Products." The complete disclosure of this PCT application is also incorporated herein by reference.

With respect to the preferred media pack 26, of cartridge 22, FIG. 7, the winding bead would typically be position adjacent inlet face 23, with a single facer bead adjacent outlet face 24. A core 57 projects to the media pack 26 adjacent the outlet end 24. Adjacent face 23, where the winding bead is located, would be less convenient location to insert the core 57. Also this type of construction avoids the necessity of a seal adjacent outlet face 24 between the media pack 26 and core 57.

In general, when the media pack 26 is a coil, at an inside side of the coil a lead end of the media combination 45 is present. It may be desirable to seal this lead end closed completely across the media combination, with a sealant, before coiling. In some arrangements such as a seal at this location can be avoided, due to the presence of the winding bead adjacent end 23 closing off a central portion of the media pack 26 adjacent inlet end 23.

Similarly, on the outside of the media pack 26, a tail end of coiled media combination 45 is present. This can be sealed closed with various sealants such as polyurethane or hot melt sealants, as desired. In some instances, the presence of the seal 28 described below, in overlap with a portion of this tail end in a region adjacent the winding bead near face 23, can obviate the criticality of a seal at this location.

The sealant used in the single facer bead and winding bead can be the same or different, and a variety of sealant materials can be used. Typically hot melt sealants or foamed sealants such as foamed polyurethanes will be used. A description of sealing to form related media packs, is provided in the above incorporated U.S. provisional application 60/467,521.

If the winding bead does not provide sufficient closure adjacent inlet end 23, additional sealant can be added at this location in the central portion of the media pack 26. This is also generally described in U.S. Provisional 60/467,521.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are scored and folded or otherwise formed by techniques not involving passage of media into a bite between corrugation rollers. However, the term "corrugated" is meant to apply even if the media is further modified or deformed after corrugation, for example by the folding techniques described in PCT/US03/02799, incorporated herein by reference.

Corrugated media is a specific form of fluted media. Fluted media is media which has individual flutes (for example formed by corrugating or folding) extending thereacross.

In general, the corrugated sheet 47, FIG. 5 is of a type generally characterized herein as having a regular, curved, wave pattern of flutes or corrugations. The term "wave pattern" in this context, is meant to refer to a flute or corrugated pattern of alternating troughs and ridges. The term "regular" in this context is meant to refer to the fact that the pairs of troughs and ridges alternate with generally the same repeating corrugation (or flute) shape and size. (Also, typically each trough is substantially an inverse of each ridge). The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet is flexible. With respect to the characterization of a repeating pattern, it is not meant that in any given filter construction, an equal number of ridges and troughs is necessarily present. The media could be terminated, for example, between a pair comprising a ridge and a trough, or partially along a pair comprising a ridge and a trough. Also, the ends of the troughs and ridges may vary from one another. Such variations in ends are disregarded in the definitions.

In the context of the characterization of a "curved" wave pattern of corrugations, the term "curved" is meant to refer to a corrugation pattern that is not the result of a folded or creased shape provided to the media, but rather the apex of each ridge and the bottom of each trough is formed along a radiused curve. A typical radius for such z-filter media would be at least 0.25 mm and typically be not more than 3 mm.

An additional characteristic of the particular regular, curved, wave pattern depicted in FIG. 5, for the corrugated sheet 47, is that at approximately a midpoint between each trough and each adjacent ridge, along most of the length of the flutes, is located a transition region where the curvature inverts.

A characteristic of the particular regular, curved, wave pattern corrugated sheet shown in FIG. 5, is that the individual corrugations are generally straight. By "straight" in this context, it is meant that through at least 70%, typically at least 80% of the length between opposite edges 53, 54, the troughs do not change substantially in cross-section. The term "straight" in reference to corrugation pattern shown in FIG. 5, in part distinguishes the pattern from the tapered flutes of corrugated media described in FIG. 1 of WO 97/40918, the complete disclosure of which is incorporated herein by reference. The tapered flutes of FIG. 1 of WO 97/40918 would be a curved wave pattern, but not a "regular" pattern, or a pattern of straight flutes, as the terms are used herein.

For the particular arrangement shown herein in FIG. 5, the parallel corrugations are generally straight completely across the media, from edge 53 to edge 54. Straight flutes or corrugations can be deformed or folded at selected locations, especially at ends. Modifications at flute ends are generally disregarded in the above definitions of "regular," "curved" and "wave pattern."

In general, the filter media is a relatively flexible material, typically a non-woven fibrous material (of cellulose fibers, synthetic fibers or both) typically including a resin therein, sometimes treated with additional materials. Thus, it can be conformed or configured into the various folded or corrugated patterns, without unacceptable media damage. Also, it can be readily coiled or otherwise configured for use, again without unacceptable media damage. Of course, it must be of a nature such that it will maintain a corrugated or folded configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is often tacked to the fluted sheet, to inhibit this spring back.

Also, in general, the media contains a resin. During the corrugation process, the media can be heated to above the glass transition point of the resin. When the resin then cools, it will help to maintain the fluted shapes.

Both of these techniques are generally known in practice, with respect to the formation of corrugated media.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Attention is again directed to FIG. 5, in which a z-filter media construction 26 utilizing a regular, curved, wave pattern corrugated sheet 47, and a non-corrugated flat sheet 46, is depicted. A distance (D1), defines the extension of flat media 46 in a region underneath a given corrugated flute. A length (D2) of the arcuate media for a corrugated flute, over the same distance D1 is of course larger than D1, due to the shape of the corrugated flute. For a typical regular shaped media used in fluted filter applications, a linear length D2 of the fluted media between points of contact with the non-fluted media will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 15:
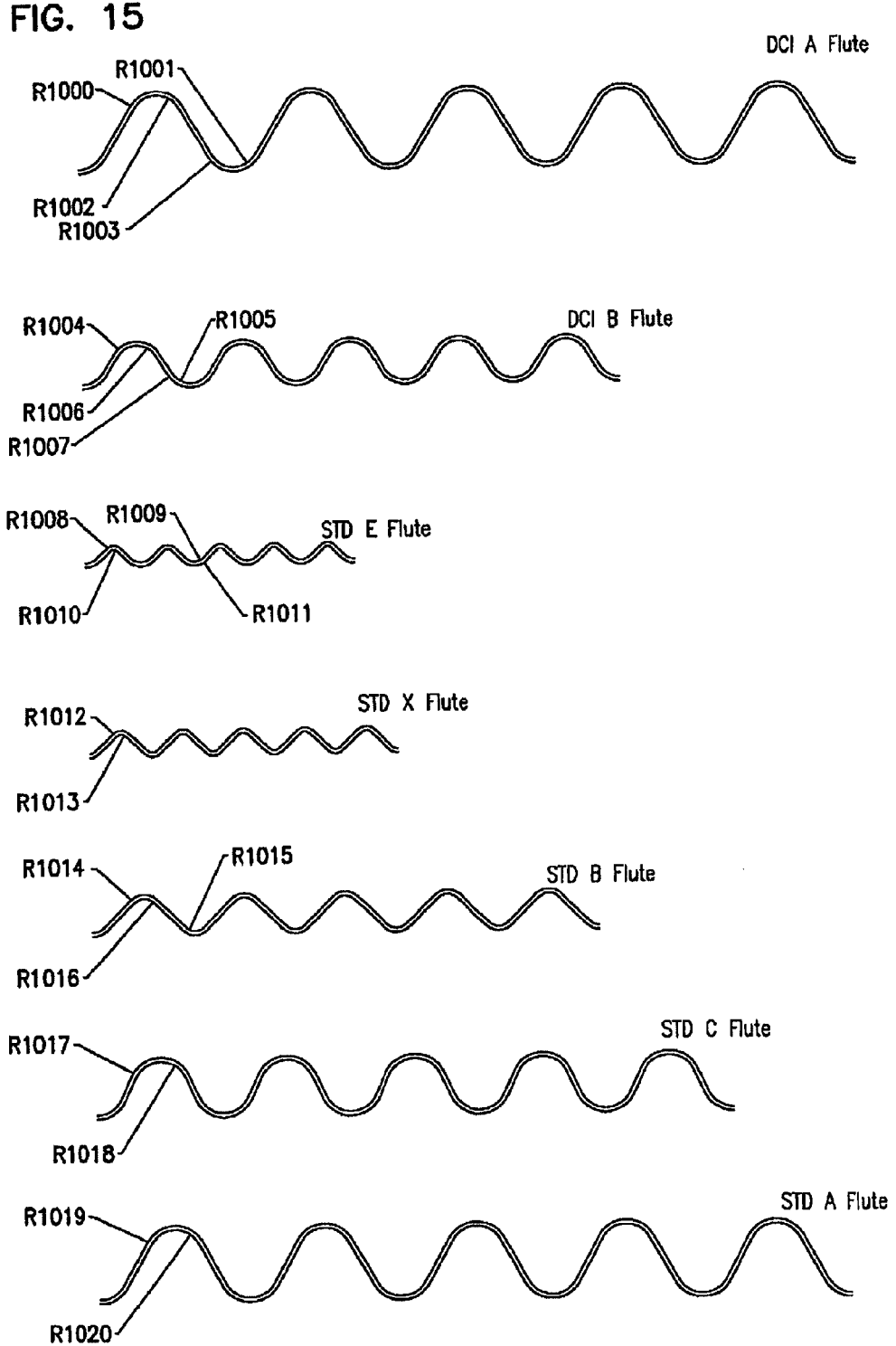
FIG. 15 is a schematic depiction of various flute definitions.

In the corrugated cardboard industry, various standard flutes have been defined. For example the standard E flute, standard X flute, standard B flute, standard C flute and standard A flute. FIG. 15, attached, in combination with Table A below provides definitions of these flutes.

Donaldson Company, Inc., (DCI) the assignee of the present disclosure, has used variations of the standard A and standard B flutes, in a variety of filter arrangements. These flutes are also defined in FIG. 15 and Table A.

TABLE A (Flute definitions for FIG. 20)

| | |
|---|---|
| DCI | Flute/flat = 1.52:1; The Radii (R) are as follows: |
| A | R1000 = .0675 inch (1.715 mm); R1001 = .0581 inch (1.476 mm); |
| Flute: | R1002 = .0575 inch (1.461 mm); R1003 = .0681 inch (1.730 mm); |
| DCI | Flute/flat = 1.32:1; The Radii (R) are as follows: |
| B | R1004 = .0600 inch (1.524 mm); R1005 = .0520 inch (1.321 mm); |
| Flute: | R1006 = .0500 inch (1.270 mm); R1007 = .0620 inch (1.575 mm); |
| Std. | Flute/flat = 1.24:1; The Radii (R) are as follows: |
| E | R1008 = .0200 inch (.508 mm); R1009 = .0300 inch (.762 mm); |
| Flute: | R1010 = .0100 inch (.254 mm); R1011 = .0400 inch (1.016 mm); |
| Std. | Flute/flat = 1.29:1; The Radii (R) are as follows: |

TABLE A-continued (Flute definitions for FIG. 20)

| | |
|---|---|
| X | R1012 = .0250 inch (.635 mm); R1013 = .0150 inch (.381 mm); |
| Flute: | |
| Std. | Flute/flat = 1.29:1; The Radii (R) are as follows: |
| B | R1014 = .0410 inch (1.041 mm); R1015 = .0310 inch (.7874 mm); |
| Flute: | R1016 = .0310 inch (.7874 mm); |
| Std. | Flute/flat = 1.46:1; The Radii (R) are as follows: |
| C | R1017 = .0720 inch (1.829 mm); R1018 = .0620 inch (1.575 mm); |
| Flute: | |
| Std. | Flute/flat = 1.53:1; The Radii (R) are as follows: |
| A | R1019 = .0720 inch (1.829 mm); R1020 = .0620 inch (1.575 mm). |
| Flute: | |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

Referring again to FIG. 2, the preferred (primary) filter cartridge 22 is serviceable. By the term "serviceable" in this context, it is meant that the filter cartridge 22 can be removed from the air cleaner assembly 1, and either be refurbished or replaced. In typical systems, the filter element 22 is periodically replaced, during a servicing operation, by installation of a new replacement cartridge.

The particular, preferred, filter cartridge 22, FIG. 7 comprises the following components: preform (shell) 25a; media pack 26; centerpiece or core 57, receiver 58, grid 59; and, seal or gasket member 28. (The grid 59 is more readily viewed in FIG. 2.) The preferred seal member 28 is generally positioned to completely circumscribe the media pack 26 and thus to separate the opposite flow faces 23, 24 of the media pack 26 from one another, with respect to flow around media pack 26. For the particular arrangement depicted, the seal member 28 is positioned to completely circumscribe the media pack 26, by being mounted on the preform 25a. For the particular, preferred, arrangement shown, the seal member 28 is positioned with axial seal surface 28a positioned within a distance no greater than 15 mm of, and preferably within a distance no greater than 8 mm of, inlet face 23, although alternatives are possible.

It is noted that in the figures, the main body or straight through flow construction of the media pack 26 is shown schematically, in the cross-sections. That is, flute detail is not depicted. As to flute detail, it is not shown in any figures other than the example of FIG. 5, for convenience. As indicated previously, a variety of flute shapes can be used. Examples depicting the ends of a z-filter element, and sealing at those ends, are provided in the drawings of U.S. Des. 396,098; U.S. Pat. No. 6,190,432; U.S. Des. D450,827; U.S. Pat. No. 6,235, 195; U.S. D437,402 and U.S. D450,828, all 6 of these references being incorporated herein by reference.

Figure 6:
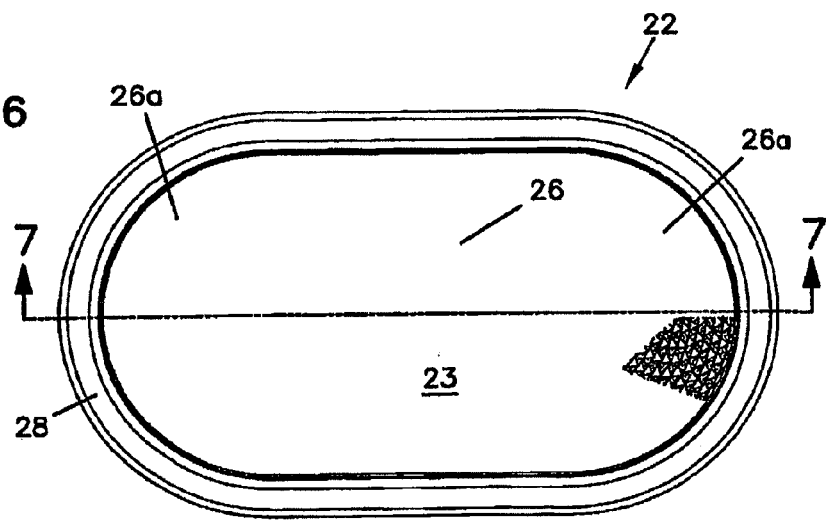
FIG. 6 is a plan view of the primary filter cartridge viewable in FIG. 2.

Referring specifically to FIG. 6 and the cross-section shown in FIG. 7, regions 26a show where the media pack 26 has been cut in cross-section, to provide the drawing of FIG. 7. Region 26b indicates a region where the cross-section line 7-7, FIG. 6, is positioned between layers of the wound media pack 26, with the surface viewable at 26b being a corrugated surface. A cross-section similar to FIG. 7 results, when the cross-section line, FIG. 6, is across coiled layers at the opposite curved ends, but between layers through the center region.

As discussed in greater detail below, in general core 57 is positioned to separate layers of wound media, in which each layer comprises a fluted sheet secured to the non-fluted sheet.

Figure 7A:
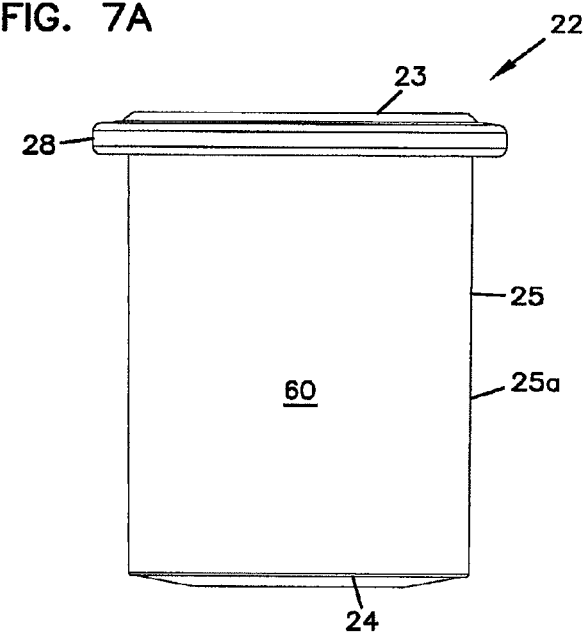
FIG. 7A is a side, elevational view of the filter cartridge depicted in FIGS. 6 and 7.

Referring to FIGS. 6-7A, for the preferred embodiment shown the preform (shell) 25a, core 57, receiver 58 and grid 59 are all integral with one another. By "integral" in this context, it is meant that the parts identified cannot be separated from one another without damage to the defined unit. Collectively, these identified parts comprise preferred preform 60. The preform 60 is prepared before the cartridge 22 is assembled. The cartridge 22 is typically assembled by inserting the media pack 26 and the preform 60 into a mold and molding the seal 28 in place. This is described in greater detail below.

Still referring to FIGS. 6-7A, preferably the preform 60 comprises a molded plastic material, such as a polypropylene. An example of a useable material would be a 25% glass-filled, 10% mica filled, polypropylene; such as a Thermofil polypropylene or an Adell polypropylene.

Figure 9:
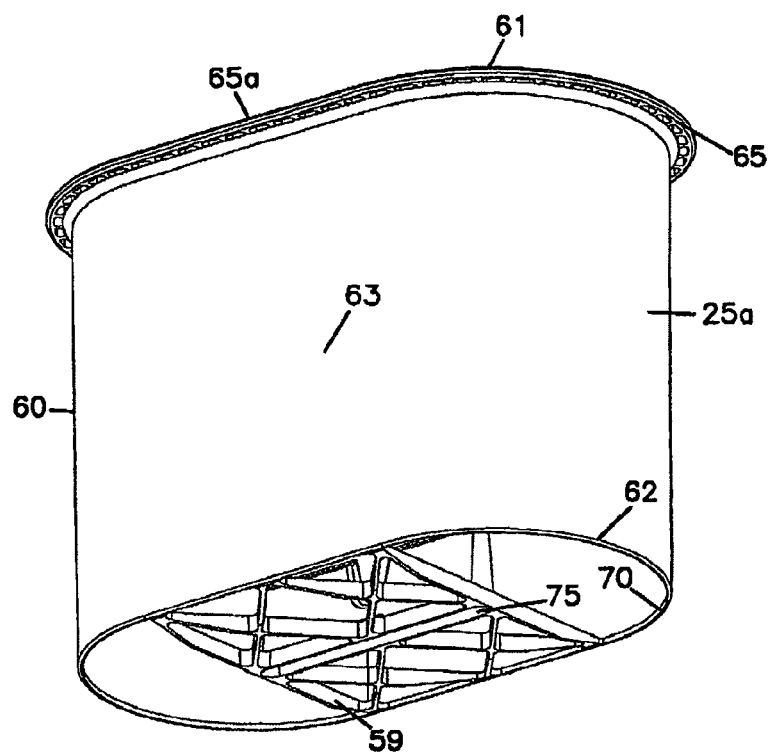
FIG. 9 is a perspective view of a preform useable to form the filter cartridge of FIGS. 6-7A.
Figure 9A:
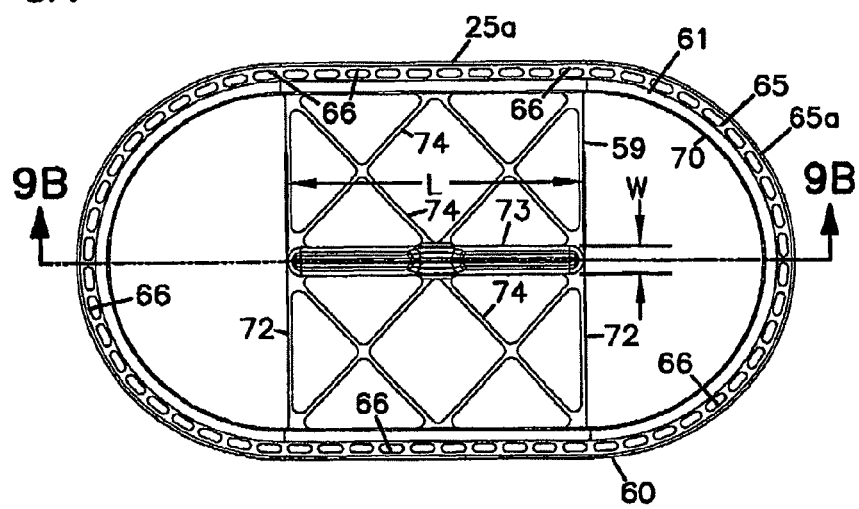
FIG. 9A is an end view of the preform depicted in FIG. 9.
Figure 9B:
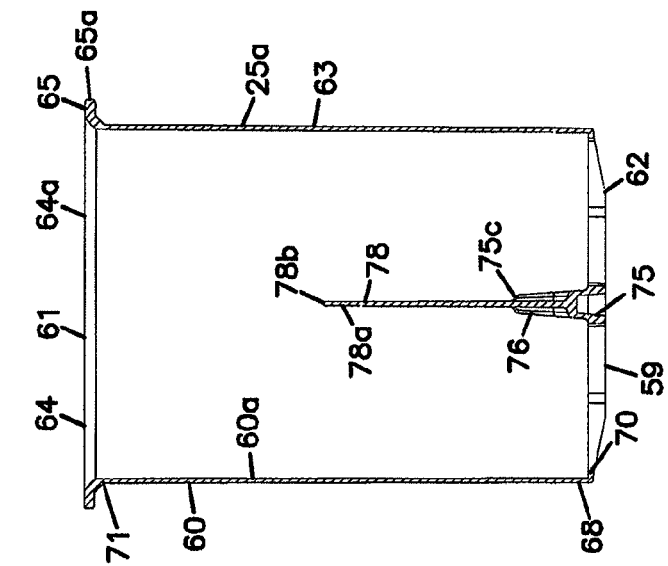
FIG. 9B is a cross-sectional view taken generally along line 9B-9B, FIG. 9A.
Figure 9C:
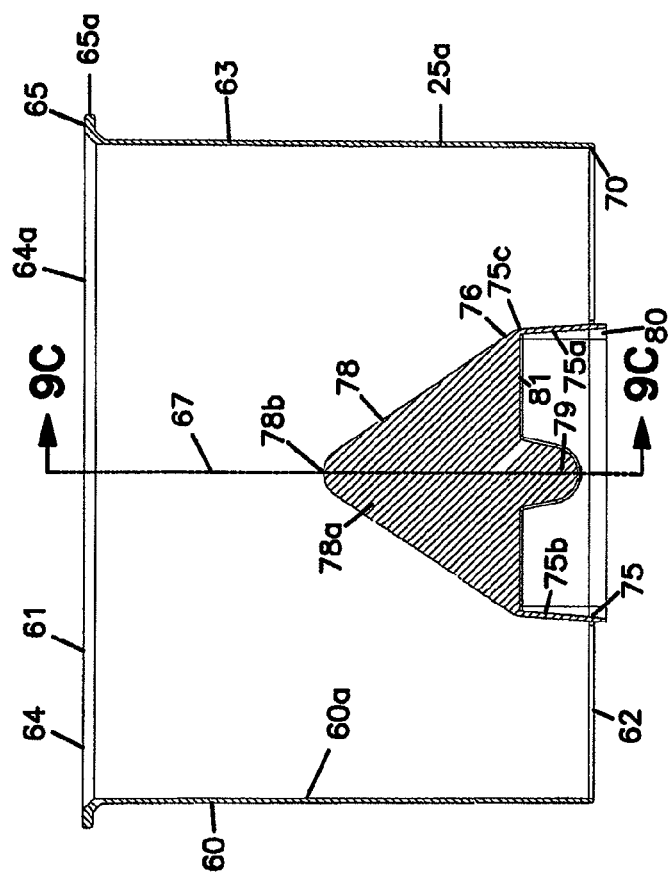
FIG. 9C is a cross-sectional view taken along line 9C-9C, FIG. 9B.

Referring to FIGS. 9-9C, preform 60 includes opposite ends 61, 62 with side wall 63 extending therebetween. Adjacent end 61, the side wall 63 has an outward funnel transition portion 64, FIG. 9B, with housing seal support 65, comprising radially outwardly directed seal support portion or lip 65a thereon. Lip 65a has seal flow apertures 66, FIG. 9A, therethrough, for use as described further below. In general housing seal support 65 will generally be characterized as radially directed, since it is directed radially outwardly from a longitudinal axis 67 of the preform 60, FIG. 9B.

As indicated below in connection with the description of FIGS. 10, 10A, funnel transition portion 64 opens up a space into which sealant can flow, during assembly. Preferably at outer edge 64a, FIG. 9C, the transition portion 64 has spread outwardly sufficiently far, to create a gap for convenient sealant flow therein during assembly.

In extension between regions 71 and 68, the side wall 63 can have a slight downwardly (or inwardly) directed taper, for convenience.

In preferred arrangements, the side wall 63 will be impermeable along its length, although alternatives are possible. Also preferably the side wall 63, in combination with the seal 28, will extend at least the entire axial length of the media pack 26, although alternatives are possible.

At end 62, grid work 59 is provided in extension across opening 70. The grid work 59 may have a variety of shapes. The particular shape provided (FIG. 9A) comprises parallel cross pieces 72, center cross piece 73, and diagonal cross pieces 74. In general, the grid work 59 is positioned to support the outlet face 24 of the media pack 26, FIG. 7. The grid work 59 inhibits media telescoping.

The center cross piece 73 defines a central, elongate, hollow receiver 75 therein, forming receiver 58, FIG. 7. The receiver 75 preferably has an outside aspect ratio (external length L FIG. 9A over external width W FIG. 9A) of at least 3:1, preferably at least 5:1 most preferably within the range of 6:1 to 10:1. Typically and preferably the external width W, FIG. 9A, is no greater than about 65%, preferably no greater than about 50%, of a longer dimension of a media pack cross-section.

Referring to FIGS. 9B and 9C, preferably the receiver 75 comprises a portion of a central core 76 including receiver 75 and non-hollow central blade 78 thereon. Also, preferably a divider 79 is provided in receiver 75 (FIG. 9B) to divide the receiver 75 into two sides 75a and 75b. Preferably each side extends in depth, inwardly from edge 80 to end 81 of at least 10 mm, preferably not more than 35 mm. Typical depth for each side would be on the order of about 15 mm to 28 mm. Preferably the shape of each side is as shown in FIG. 9B.

Referring to FIGS. 6 and 7, outside surfaces of receiver 75 comprise a core projecting into coiled media pack 26. Typically, the coiled media pack 26 would be formed into coil, and then be inserted over receiver 75. That is, in typical assembly the media pack 26 would not be coiled with core 76 in position. Rather the media pack 26 would first constructed in its coiled form, then would be inserted into interior 60a of preform 60, through end 61, and continue to be pushed inwardly to push the blade 57 (78) between layers of the media pack 26, guiding core 75 into position. The somewhat triangular shape and relative thinness of blade 78, FIG. 9B, facilitate this assembly.

More specifically, extending from inner end 75c (FIGS. 9B and 9C) of receiver 75, axially inwardly of shell 25a is provided central vane or blade arrangement 78. The blade 78 preferably comprises a non-hollow, triangularly shaped blade 78a preferably no more than 3.0 mm thick between regions 75c and 78b; and no more than 2 mm thick at tip 78a. Typically adjacent region 75c the blade 78 is about 2 mm thick, and at tip 78b it is about 1.0-1.5 mm thick (for example 1.3 mm) with a taper in between. The relatively thin, non-hollow, blade 78 facilitates in pushing media pack 26 into shell 25a with a portion around receiver 75. The blade 78 is preferably triangular in shape, with rounded tip 78a opposite receiver 75.

Preferably blade arrangement 78 projects inwardly of media pack a distance from outlet end 24 at least 30% of axial length of the media pack, typically at least 40% of this length. Preferably blade 78 does not extend further than 75% of the axial length of the media pack, typically not more than 60% of this length, and thus blade 78 ends spaced from opposite end surface 23 of the media pack 26.

Figure 17:
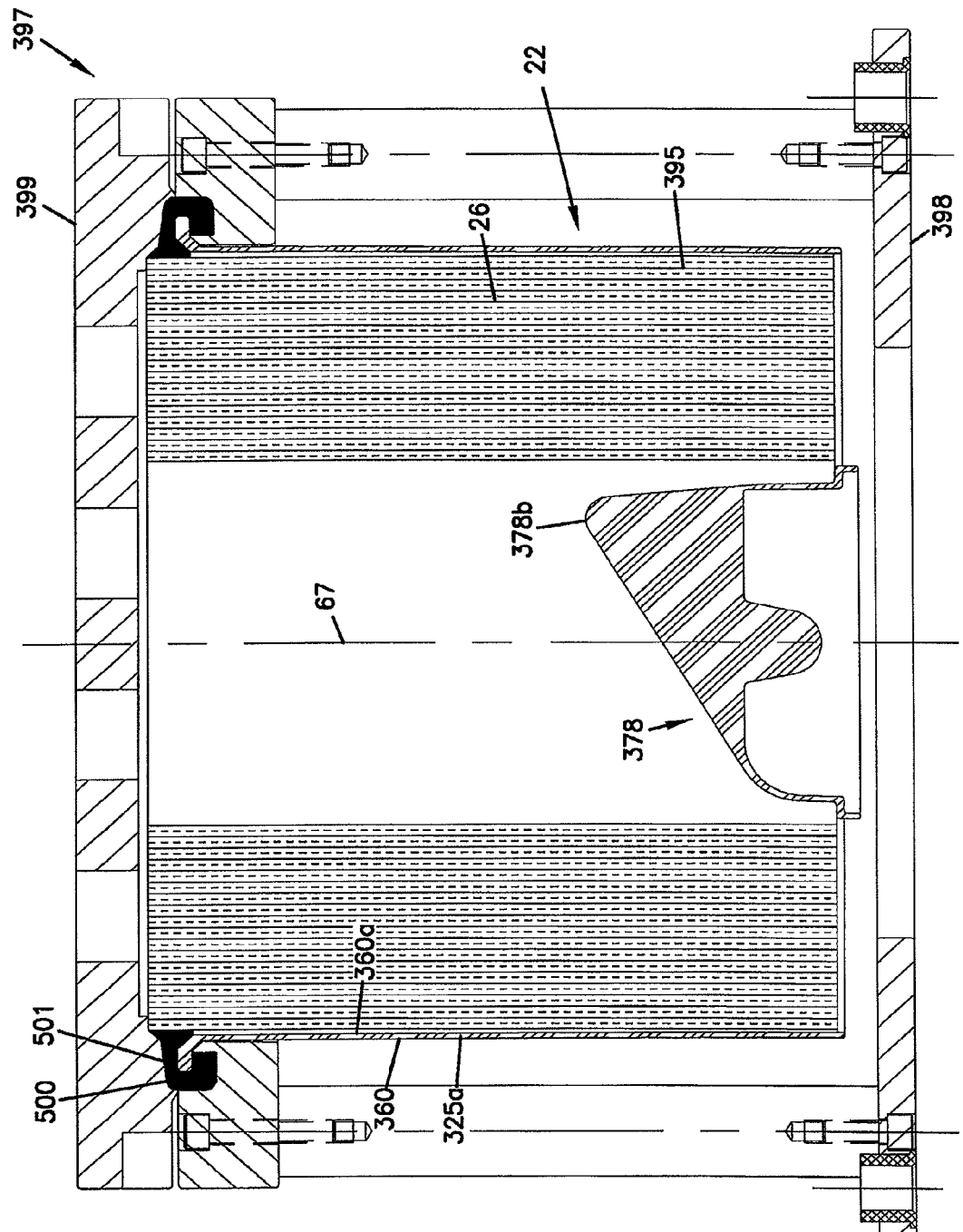
FIG. 17 is a cross-sectional view of a mold arrangement, analogous to the mold arrangement depicted in FIG. 10, and showing an alternate embodiment of a preform.

FIG. 17 shows the filter cartridge 22 with an alternate embodiment of a preform 360. The particular arrangement in FIG. 17 shows the filter element 22 within a mold arrangement 397, to be described further below. The filter cartridge 22 is shown in cross-sectional view and an alternate central vane or blade arrangement 378 can be seen. The blade 378 facilitates in pushing the media pack 26 into the shell 325a. The blade 378 is preferably triangular in shape, with a rounded tip or apex 378b.

The blade 378 of FIG. 17 differs from the blade 78 of FIG. 9b in that the apex 378b is offset from the central axis 67. That is, the apex 378b is located off to the side of the axis 67. The blade 378 has the general shape of a right triangle, rather than the appearance of equilateral or isosceles triangle of FIG. 9. The blade 378 generally has the same thicknesses and depth of penetration into the media 26 as the blade 78. The blade 378 is formed with the apex 378b offset from the central longitudinal axis 67 for ease and convenience of pushing the blade 378 between layers of the media pack 26. When the apex 378b is offset from the central longitudinal axis 67, the blade 378 first enters between layers of media 26 that are closer to the turn in the coiled media pack 26. At the portion of the turn in the coiled media pack, the layers of media 26 are not as tightly packed together as, for example, the very center of the media pack, and this creates a larger gap between layers of media which facilitates an easier insertion of the blade 378 between the layers of the coiled media.

Attention is now directed to FIG. 7, in which the seal arrangement 28 is shown secured to lip or flange 65 (i.e., housing seal support) of preform 60. This is also shown in exploded view in FIG. 8.

Figure 8:
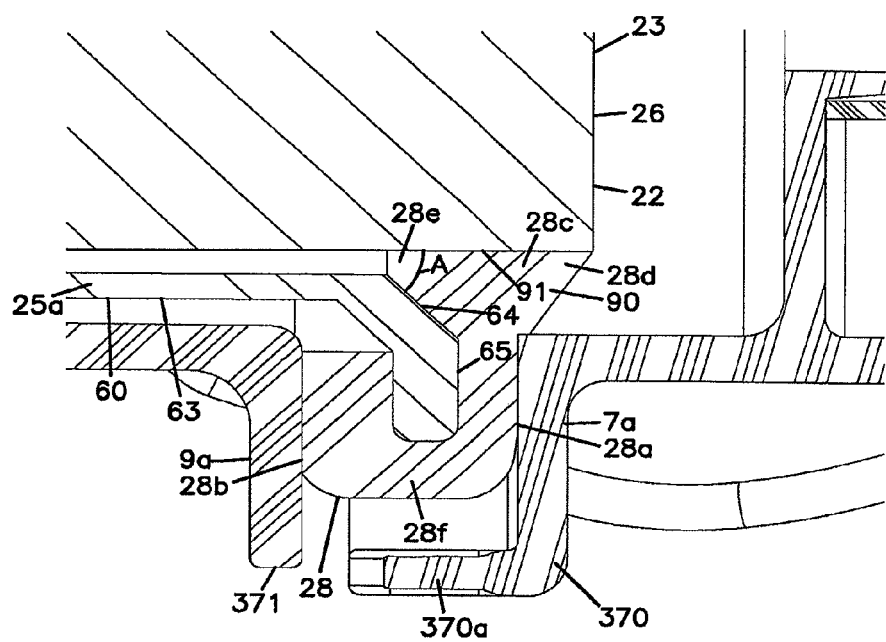
FIG. 8 is an enlarged fragmentary view showing an interaction between a gasket member mounted on the primary filter cartridge and structural members on certain housing components.

Referring to FIG. 8, seal 28 is molded directly to the lip or support 65. Further, an integral portion 90 of seal 28 is molded directly to the media pack 26 at 91, sealing the seal 28, preform 25a and media pack 26 together, at this location. The seal 91 is preferably directly to the facing sheet 46 and preferably completely around the media pack 26. The seal 91 also preferably starts on a portion of the media pack 26 adjacent one of the flow faces, in this instance flow face 23. Preferably the seal 28 includes no portion extending over a flow face.

Referring to FIG. 8, seal 28 is an axial pinch seal, with respect to the housing 2. In particular, it is pinched between sections 7 and 9 of the housing, in particular between housing extensions 9a and 7a. Typically the seal 28 will be configured to compress in thickness, when installed. Preferred materials for the seal 28 comprise foamed sealant materials, such as foam polyurethane, which can readily compress to form a strong seal. Useable polyurethane seal materials include those described in U.S. Pat. No. 6,350,291 and U.S. application Ser. No. 10/112,097, filed Mar. 28, 2002, both of which are incorporated herein by reference, although alternatives are possible.

As described, the seal 28 is specifically an axial pinch seal (or axial housing seal). It can be configured with relatively flat opposite surfaces 28a, 28b, or with opposite surfaces that have a ridge or groove therein. Alternate seals can be used, including radial seals.

In general surfaces 28a, 28b comprise housing engagement seal regions, since it is these regions that engage the housing, during sealing.

Figure 10A:
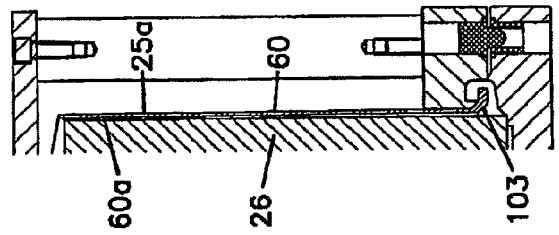
FIG. 10A is a fragmentary cross-sectional view of the arrangement of FIG. 10, taken generally along line 10A-10A thereof.
Figure 10:
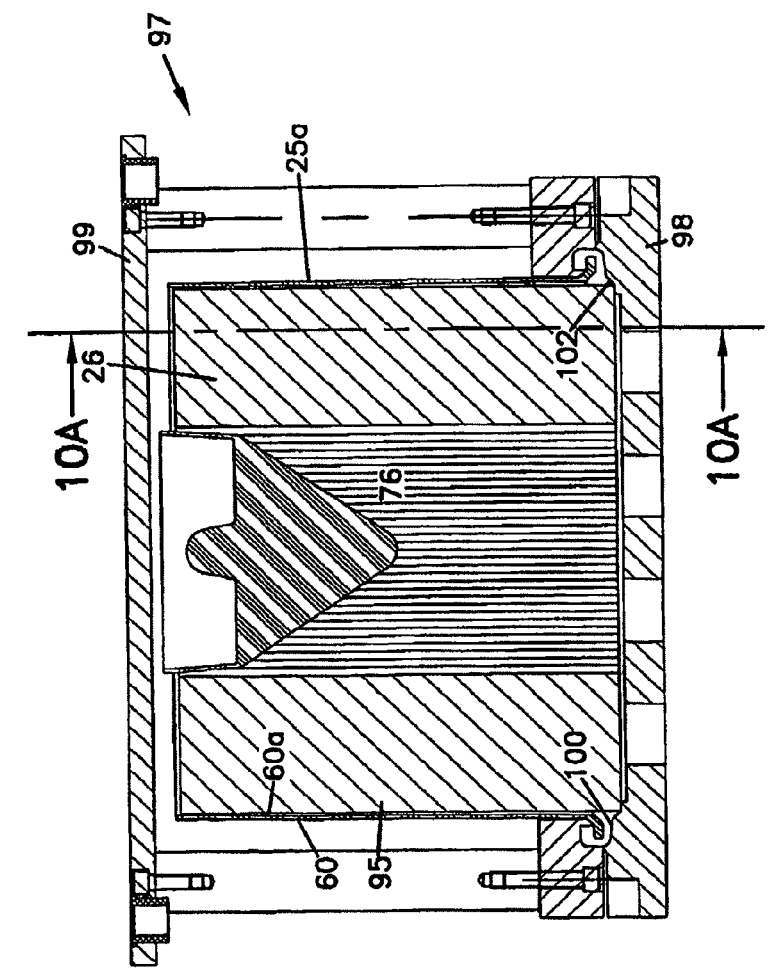
FIG. 10 is a cross-sectional view of a mold arrangement including the preform of FIG. 9 with a media pack therein, positioned in a mold for forming a housing seal arrangement of the filter cartridge depicted in FIGS. 6-7A.

A useable method for generating this type of seal arrangement can be understood by reference to FIGS. 10, 10A, and 17 and the following description. In FIG. 10, the media pack 26 is shown inserted into an interior 60a of preform 60. It would be understood, that the media pack 26 would be positioned with core 76, projecting into the media pack 26, between media layers.

The assembly 95 comprising the shell 60 and media pack 26 are shown positioned in mold arrangement 97. The mold arrangement 97 includes a mold base 98 and a mold cover 99 defining cavity 100 therebetween. The cavity 100 is configured for formation of the seal 28. The seal 28 is formed by dispensing a curable resin into mold cavity 100, preferably after assembly 95 is positioned in base 98 and before cover 99 is in place. In operation, a foaming urethane (which preferably will increase in volume at least 20%, typically at least 40% and usually 50-100% during cure), would be used.

Before resin cure, the mold cover 99 would be put into position. The mold cover provides definition of a portion of seal 28. During molding, the resin will rise to fill cavity 100. This rise would generally involve flow through apertures 66 in housing seal support 65, FIG. 9A. As a result of flow through these apertures, after cure the seal 28 will be mechanically secured to the seal support 65, due to a portion of the resin being cured and left in extension through the apertures 66.

Sealing of a portion of the cured seal 28 directly to the media pack 26a will also occur at region 100, since in this region the resin will directly contact the media pack. Flow across end surface 23 will generally be prevented by sloped region 102 of the cavity 100 engaging in the media pack 26. If necessary to inhibit flash at this location, the media pack 26 can be pinched by the mold at this region; or, a thixotropic bead can be placed between the media pack 26 and the mold base 98 at this location.

Referring to FIG. 10A, at 103, the funnel surface 64 (FIG. 9B) of the preform 60 creates a surface diagonal upwardly toward the media pack 26. This slope will help directed resin toward the media pack, and also inhibit trapping of air at this location during the molding process.

FIG. 17 illustrates an alternate embodiment of a method for generating preferred types of seal arrangements described herein. In FIG. 17, the media pack 26 is shown inserted into an interior 360a of a preform 360. The assembly 395 comprising the shell 360 and media pack 26 are shown positioned in the mold arrangement 397. The mold arrangement 397 includes a mold base 398 and a mold cover 399 defining a cavity 400 therebetween. The cavity 400, in this embodiment, is shown filled with resin 401. The cavity 400 is configured for formation of the seal 28. The seal 28 is formed by dispensing a curable resin into the mold cavity 400, preferably after the assembly 395 is positioned in the base 398 and before the cover 399 is in place. In operation, a foaming urethane would be used. A foaming urethane would preferably increase in volume at least 20%, typically at least 40%, and usually 50%-100% during cure.

Before the resin cures, the mold cover 399 would be put into position on the base 398. The mold cover 399 provides definition of a portion of seal 28. During molding, the resin will rise to fill cavity 400. This rise would generally involve flowing through apertures 66 in the housing seal support 65 (FIG. 9a). As a result of flowing through these apertures, after curing, the seal 28 will be mechanically secured to the seal support 65, due to a portion of the resin being cured and left in extension through the apertures 66.

Thus, advantageously, the seal 28 (FIG. 8) for arrangements according to the present disclosure provide for both: a housing seal portions as indicated at 28a, 28b as opposite surfaces for sealing with a housing in use; and, a portion 28c, integral with the housing seal portion 28a, which provides for: a seal directly to the media 26; a seal around the media pack 26; and, a seal of the media pack 26 and the preform 60, 360 (or 25a). These seal portions (28a, 28b, 28c) are preferably integral with one another and are simultaneously molded from a single resin shot. By "integral" in this context, it is meant preferably regions 28a, 28b, 28c are all portions of the same cure or pool or volume of resin, without separation therebetween. This is preferred, for convenient assembly without multiple sealing steps.

Referring to FIG. 8, the preferred shape of the seal 28 includes portion 28d directed upwardly (toward end 23) from surface 28a; with portion 28e oppositely directed, to fill in a region between funnel surface 64 and media pack 26. Regions 28a and 28b are positioned at opposite sides of lip 65, with transition portion 28f preferably positioned to extend therebetween.

Angle A, the acute angle between media pack 26 and funnel surface 64 preferably extends at an angle A within the range of 30° to 60° inclusive, more preferably 35° to 55° inclusive.

This type of molding operation uses some principles related to that described in U.S. provisional application 60/532,783 filed Dec. 22, 2003, the complete disclosure of which is incorporated herein by reference. Some of the techniques used in that application can be applied to provide for the seal arrangement shown in FIG. 8. It is noted that the particular location and shape of the present FIG. 8 seal is quite different, as well as the location and nature of the preform piece used. Further the specific example seals shown are of different types with respect to how the housing is preferably engaged.

Although the media packs can be made in a variety of sizes and shapes, a typical media pack useable in the specific configurations depicted, will have an axial length of at least 140 mm, and a longer cross-sectional length axis of at least 190 mm and a shorter cross-section axis or length of at least 110 mm.

Referring to FIG. 8, generally the interface between media pack 26 and seal material of seal 28, is over a distance of extension along the media pack of at least 4 mm, and typically 5-15 mm. This extension helps provide for a good secure engagement between the media pack 26 and the seal 28. Further the seal 28, will operate for some dampening affect with respect to vibration, of the equipment on which the assembly 1 is installed, being transmitted undesirably to the media pack 26 potentially damaging the media pack 26 at this location. That is, the desirable dampening effect of the material 28 facilitates integrity of the filter cartridge 22, during use.

C. Usable Safety Filters

In reference now to FIGS. 11-14, an embodiment of a usable safety filter 20 is illustrated. In preferred systems, the safety filter 20 is oriented in the air cleaner 1 downstream of the primary filter cartridge 22 in order to protect downstream components from debris that could get passed the primary filter cartridge 22, in case of failure of the primary filter cartridge 22. In addition, the safety filter 20 helps to protect the engine while servicing the air cleaner 1 while preventing debris from falling into clean air region 32, FIG. 4.

The safety filter 20 has an outside periphery 170 that preferably matches, in general shape, the outside periphery of the primary filter cartridge 22. In the embodiment illustrated, the safety filter 20 is obround, but can be other shapes such as circular. The particular obround shape shown is a racetrack shape with a pair of opposite sides 172, 173, joined by a pair of rounded or curved, opposite, ends 174, 175.

Figure 11:
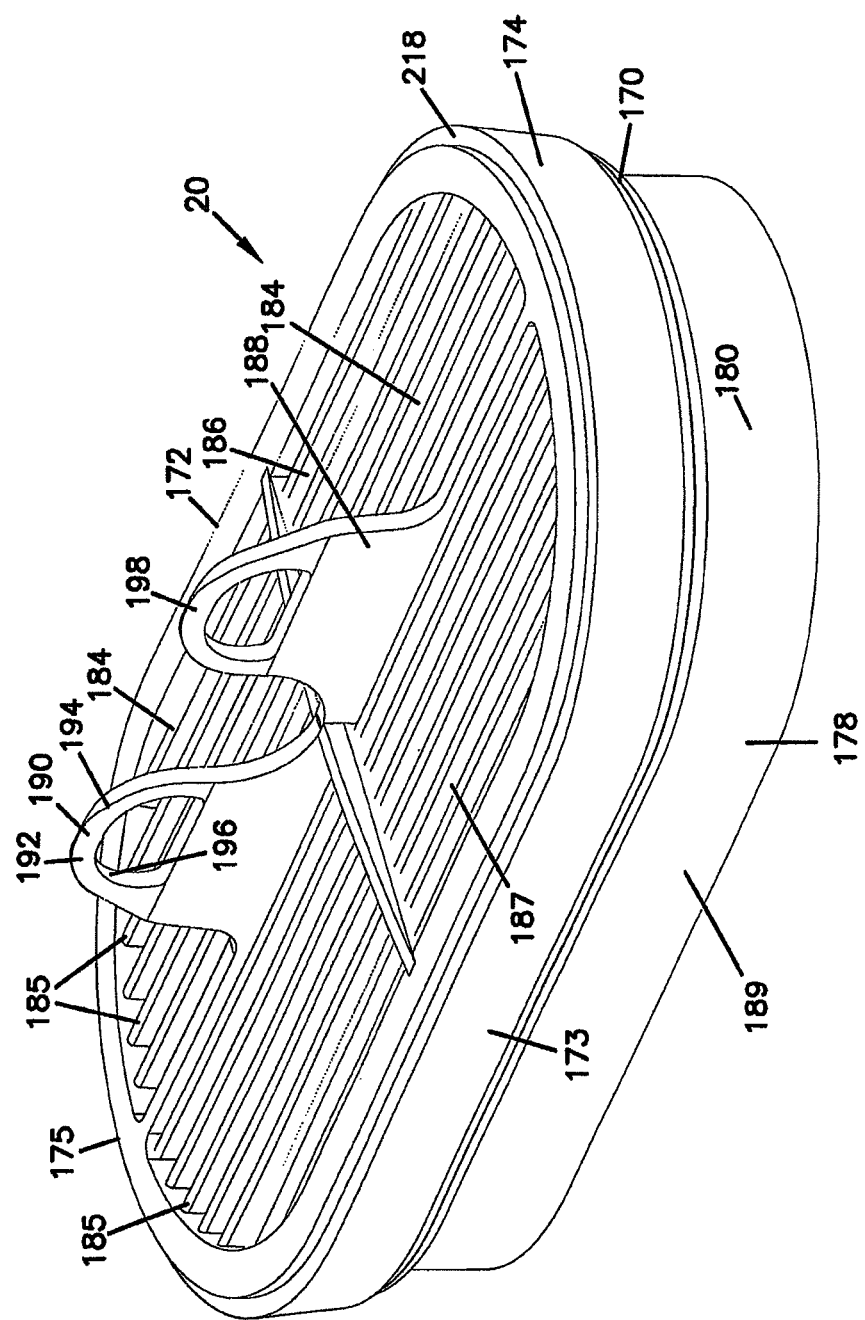
FIG. 11 is a perspective view of a safety filter usable in the air cleaner arrangement depicted in FIG. 2.
Figure 14:
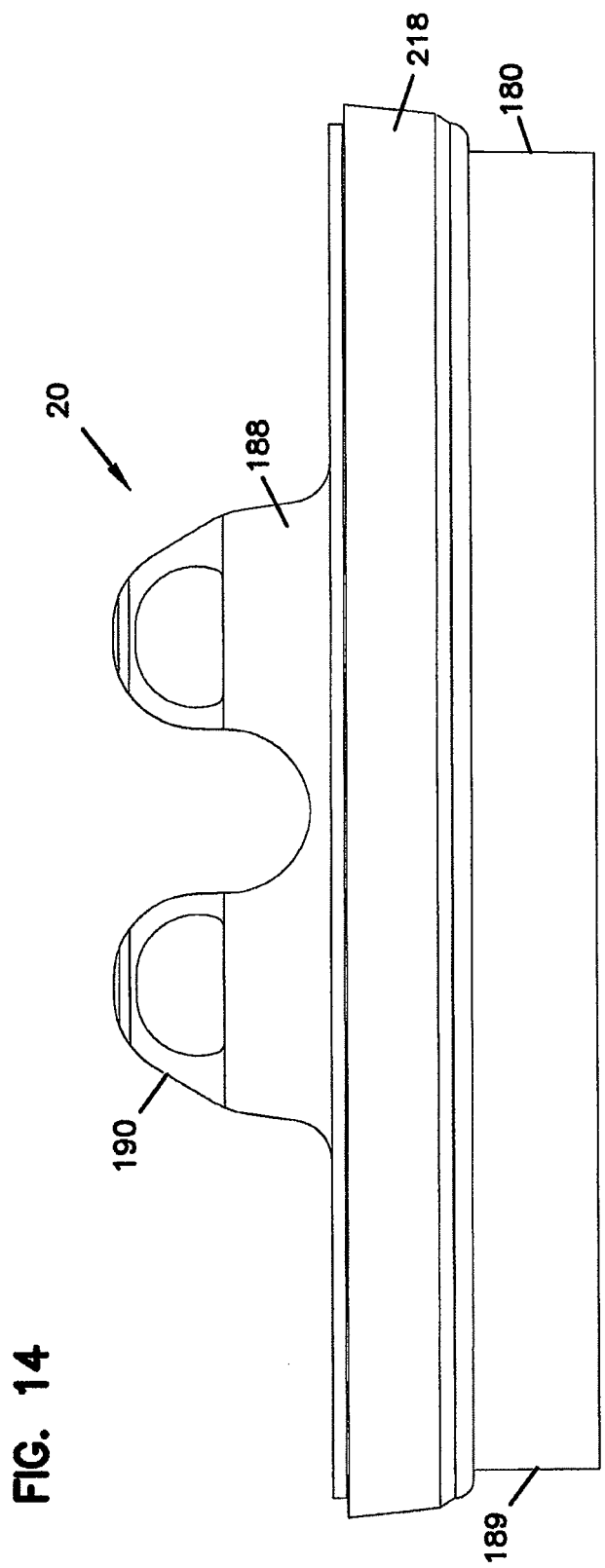
FIG. 14 is a side elevational view of the safety filter depicted in FIG. 11.

In the illustrated embodiment, the safety filter 20 includes a rigid, structural frame 178. Forming a portion of the frame 178 is a skirt or band 180. The band 180 circumscribes an internal region of filter media 184. A variety of types of media 184 can be utilized. In the configuration shown, the media 184 is pleated, with the pleats 185, FIG. 11, extending parallel to the straight sides 172, 173. Pleat densities of at least two pleats per inch, and typically 3-8 pleats per inch, are useable, for example. In FIG. 11, it can be seen how there are two regions of pleats 186, 187. The first pleat region 186 is separated from the second pleat region 187 by a partition 188 of the frame 178 that generally bisects the safety filter 20. The bisecting wall 188 extends longitudinally along the safety filter 20 between curved end 174 and curved end 175.

In the preferred embodiment, the safety filter 20 includes a handle 190 that is sized to accommodate at least a portion of a human hand. By "sized to accommodate a portion of a human hand", it is meant that the handle 190 has structure between it and the remaining portion of the safety element 20 that allows at least a part of hand (a finger or fingers) to fit between the handle structure and the remaining portion of the safety filter 20 to allow for manipulation of the safety filter 20.

In the embodiment shown, the safety filter 20 includes the handle 190 projecting from the frame 178. In preferred embodiments, the handle 190 is an integral extension of the partition 188. A variety of handle constructions 190 are usable. In the one shown, the handle 190 has at least one projection 192 extending from the frame member 189. The projection 192 can take various configurations, including knobs, rings, extensions, etc. In the one shown, the projection 192 takes the form of an arm 194 defining a void 196, FIG. 12. In preferred embodiments, the void 196 goes completely through the arm 194.

In particular preferred embodiments, the handle 190 includes a second projection 198. The second projection 198 can also take a variety of shapes or configurations. In the one shown, the projection 198 has the same shape as projection 192, in the form of an arm 202 having a void 204 (FIG. 12) therebetween.

The sizes of the voids 196, 204, in preferred embodiments, are large enough to accommodate a gloved finger of a human hand, to assist with manipulation of the safety element relative to the air cleaner 1. For example, the voids 196, 204 define a cross-sectional area of at least 2 cm$^2$, typically 4-100 sq. cm$^2$. The projections 192, 198 are separated from each other by a landing 206, FIG. 12, in the partition 188.

In preferred uses, volume 205 defined by landing 206 and the inner sides 207, 208 of each projection 192, 198 accommodates the apex 152 (FIG. 7) of the centering construction 79 of the core 57, see FIG. 4. In such preferred uses, the projections 192, 198 operate as guides 212, 214 (FIG. 12) to help operably orient the primary filter cartridge 22 in place in the air cleaner 1. The guides 212, 214, can be sized to help to center and place the filter cartridge 22 within the air cleaner 1.

Still in reference to FIGS. 11-14, the preferred safety filter 20 includes a seal member 218 to help form a seal 220 (FIG. 4) between the safety filter 20 and the air cleaner section 9 of the housing 2. In the one shown, the seal member 218 is secured to the band 180 around the entire periphery of the band 180. The seal member 218, in the one shown, forms a radially directed seal 221 (FIG. 4) between and against the band 180 and the inside surface 120 of the air cleaner section 9 of the housing 2.

Useful media 184 can include many different types of conventional filter media. This includes cellulose, synthetic, and various blends. One usable, convenient media is a synthetic/glass fiber blend having a weight of 70±4.0 lb./3,000 ft.$^2$ (114±6.5 g/m$^2$); a thickness of 0.032±0.003 in (0.81±0.08 mm); a Frazier permeability of 165±20 ft./min. (50.3±6.1 m/min.); a pore size of 100±8 microns; a dry tensile strength of 19.8±6.6 lb./in (9.0±3 kg/in); and a burst strength of 20±5 psi (138±34 kPa).

D. Usable Precleaner Constructions

In FIGS. 2-4, a preferred precleaner section 8 is illustrated. While a number of different, conventional precleaners can be used upstream of the primary filter element 22, the particular precleaner 8 illustrated can be used to advantage.

Figure 2A:
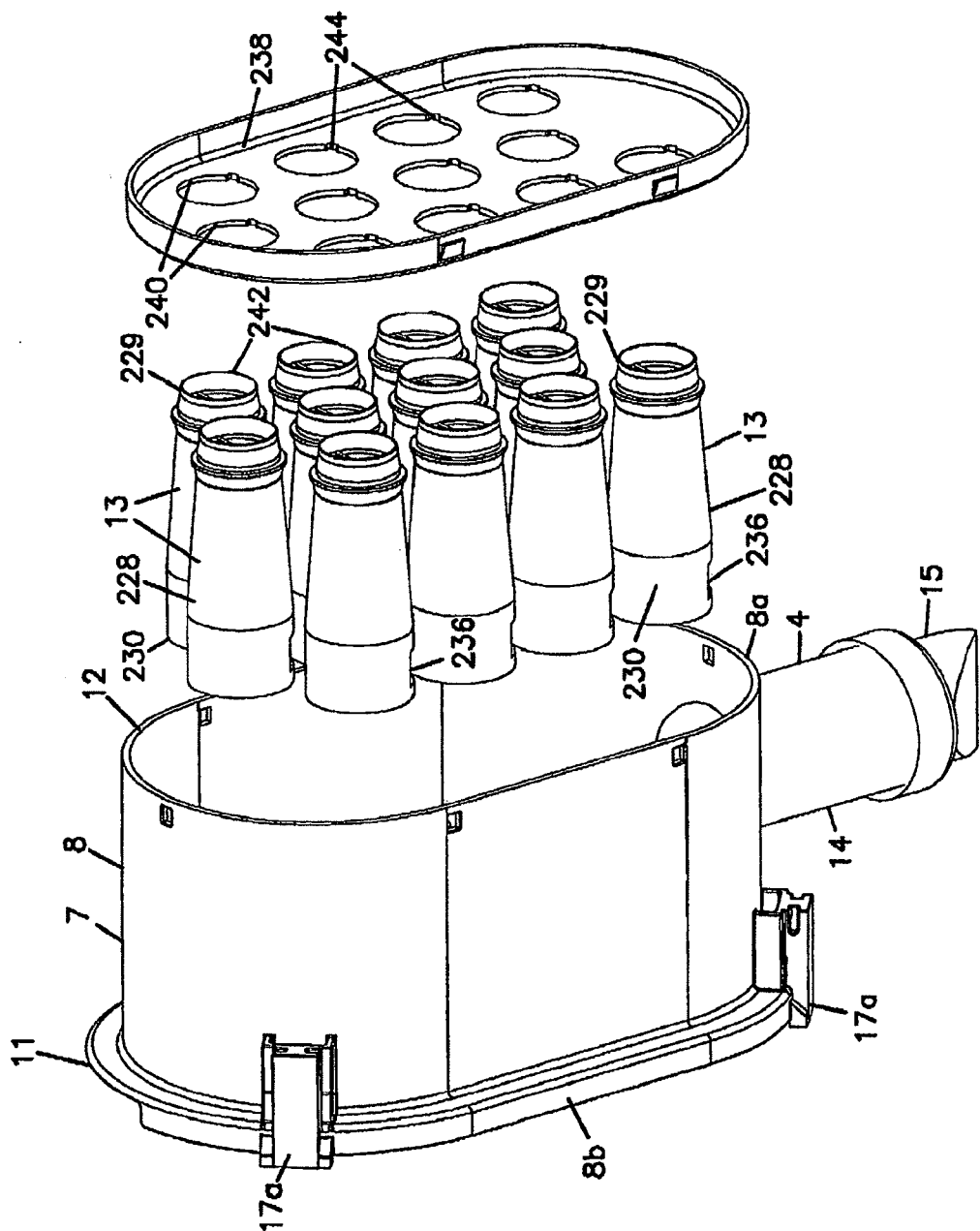
FIG. 2a is an exploded, perspective view of a precleaner assembly portion of the air cleaner arrangement depicted in FIG. 1.

As mentioned above, the precleaner 8 includes a plurality of centrifugal separator tubes 13, FIG. 2A. Each of the tubes 13 include an outer surrounding substantially cylindrical wall 228 that is tapered between opposite ends 229, 230. The end 229 has a smaller diameter than the end 230. The end 229 will be oriented upstream to the end 230. Located within the wall 228 is a vortex generator 232, FIG. 3, including vanes or curved blades 234. The wall 228 also includes at its downstream end 230 an outlet port 236, FIG. 2A.

Each of the tubes 13 is received within an upstream baffle plate 238, FIG. 2A. The baffle plate 238 includes a plurality of apertures 240 sized to receive the upstream end 229 of the tubes 13. The upstream end 229 of each of the tubes has a tab 242 (FIG. 3) that is received within a slot 244, FIG. 2A, which is part of the aperture 240. This tab/aperture forms an indexing arrangement 246 (FIG. 3) that ensures that each of the outlet ports 236 on each of the tubes 13 is pointed in the direction toward the dust ejection tube 4.

The preferred precleaner 8 depicted also includes a plurality of extraction tubes 250, FIG. 4, that are received within the tubes 228. In preferred implementations, each of the extraction tubes 250 is molded as an integral part of the cover 7. As such, in preferred embodiments, the cover 7 includes as an integral, molded, one-piece member: the side wall 252, the tube 14, a downstream baffle plate 254, and each of the extraction tubes 250.

To assemble the precleaner 8, each of the tubes 228 is inserted into a corresponding aperture 240 in the baffle plate 238. The indexing arrangement 246 is used by aligning the tab of each of the tubes 228 into a corresponding slot 244 to ensure that the outlet port 236 is pointed in a direction toward the ejector tube 4. The upstream baffle plate 238 with each of the tubes 228 installed there within is then oriented over the remaining portion of the precleaner 8. Each of the ends 230 of the tubes 228 is oriented over a corresponding extraction tube 250, and the baffle plate 238 is secured, such as by a snap fit, onto the side wall 252.

The precleaner 8 operates as follows: a gas flow stream containing particulate matter flows through the upstream end 229 of each of the tubes 13. The flow is induced to rotate by the vortex generator 232. The rotating nature of the flow stream causes centrifugal forces to act on the particulate matter in the gas flow stream. The particulate matter heavier than the gas in the flow stream and migrates toward the wall 228.

The particles are ejected from the outlet ports 236, while the remaining gas stream flows through the extraction tubes 250. From the extraction tubes 250, the air flows downstream and into the upstream flow face 23 of the primary filter element 22. The particulate matter that is ejected from the outlet ports 236 falls by gravity downwardly through the ejection tube 4 and out through the ejection valve 15.

E. Methods

In general, a method of sealing a filter element having a straight through flow construction, as described, is provided. The preferred method generally includes positioning opposing flanges of a cover and a primary air cleaner section, as described, in engagement with the projecting axial seal gasket (on the element) and axially compressing the gasket, as shown.

A method for mounting a sealing gasket in a filter cartridge having a straight through flow construction, as described, is provided. One example method generally includes sealing a preform and media pack together, with the same seal material shot that will form a housing seal for the cartridge.

To clean gas, first, the filters (20, 22) should be installed within the air cleaner 1. The cover 8, containing a precleaner, is removed from the air cleaner section 9 of the housing 2. The safety filter 20 is provided. The safety filter 20 is handled and manipulated by grasping the handle 190, such as putting fingers through the voids 196, 204. The safety filter 20 is placed through the open end of the air cleaner section 9 and installed within the portion 32. The gasket 220 is compressed between and against the wall 9 to form a radial seal 221 between the safety filter 20 and the air cleaner section 9.

Referring to FIG. 4, next, the primary filter cartridge 22 is provided. The primary filter cartridge 22 is manipulated such that the downstream end 24 is placed first through the open end of the air cleaner portion 9. The receiver 75 is aligned with the guides 212, 214 to be received therein. In particular, the core 57 has receiver pockets 164, 167, FIG. 4, that receive the guides 212, 214 there within. The centering structure 152 of the core 57 interacts with the guides 212, 214 to help align and center the primary element 22 within the air cleaner section 9.

The primary filter cartridge 22 is centered as described above and oriented such that the gasket 28 rests upon the flange 371 of the air cleaner section 9. Next, the precleaner section 7 is oriented over the air cleaner section 9 so that the flange 370 rests on the gasket 28. The over center latches or clamps 17 are then used to apply axial force at joint 11 and form an axial seal with the gasket 28 between the precleaner section 7 of the housing and the air cleaner section 9 of the housing. Flange 370 includes peripheral extension 370a, FIG. 8, to cover outer annular portion 28f of seal 28.

To clean air, the air enters the precleaner 7 through the centrifugal tubes 13. The vortex generator 232 causes the gas flow to rotate, which causes the particulate matter to migrate toward the walls 228. The particulate matter is then ejected through the outlet ports 236, to fall by gravity through the dust ejector tube 14. The precleaned air then flows through the extraction tubes 250 and then through the inlet face 23 of the primary filter element 22. The media pack 26 removes further particulate material from the air. The cleaned air then flows through the outlet face 24. Next, the cleaned air flows through the media 184 of the optional safety filter 20, and then through the outlet tube 3. From there, the cleaned air flows to downstream equipment, such as an engine.

After a period of use, the air cleaner 1 will require servicing. To service the air cleaner 1, the precleaner section 7 is removed from the air cleaner section 9 of the housing 2. This is done by releasing the clamps. When the clamps 17 are released, this releases the axial seal formed by the sealing gasket 28. The upstream face of the filter cartridge 22 is then exposed. The filter cartridge 22 is grasped and removed from the air cleaner section 9. The primary filter cartridge 22 can be disposed of or recycled, in convenient applications. If the safety filter 20 also needs servicing, the handle 190 is grasped, and the safety element 20 is removed from the air cleaner section 9 and disposed of or recycled. It should be understood that in many applications, the primary filter cartridge 22 will require replacement, while the safety filter element 20 will not require replacement.

If the safety filter 20 is being replaced, then a second, new safety filter element 20 is inserted into the housing 2, as described in the initial installation description above. Next, a new primary filter cartridge 22 is provided and is installed within the air cleaner section 9, as described above. The precleaner section 8 is placed over the air cleaner section 9, and the axial seal is formed with the gasket 28.

What is claimed is:

1. An air filter cartridge comprising:
  (a) a media pack comprising a fluted media sheet secured to a facing media sheet, the media pack having an inlet flow face, an outlet flow face, and an axial length between the inlet flow face and the outlet flow face, wherein the media is closed to the flow of unfiltered air therethrough;
  (b) a preform having a sidewall portion circumscribing the media pack and including a seal support, wherein the media pack is secured within the preform; and, the preform includes a plurality of apertures therethrough in a portion of the preform surrounding the media pack;
  (c) a seal arrangement secured on the seal support; and
  (d) the media pack has a cross section with a pair of opposite sides joined by a pair of curved opposite ends.

2. An air filter cartridge according to claim 1, wherein the preform comprises a molded plastic material.

3. An air filter cartridge according to claim 1, wherein the seal arrangement comprises foam polyurethane.

4. An air filter cartridge according to claim 1, wherein the preform is secured to the media pack by the seal arrangement.

5. An air filter cartridge according to claim 1, wherein the seal arrangement is constructed to provide an axial seal when in sealing engagement with an air cleaner housing.

6. An air filter cartridge according to claim 1, wherein the media pack comprises a coiled media pack.

7. An air filter cartridge according to claim 1, wherein the preform includes a portion extending over one of the media pack flow faces.

8. An air filter cartridge according to claim 1, wherein the preform includes a portion extending over the outlet flow face of the media pack.

9. An air filter cartridge according to claim 7, wherein the portion extending over one of the pack flow faces comprises a grid work.

10. An air filter cartridge according to claim 9, wherein the grid work comprises diagonal cross pieces.

11. An air filter cartridge according to claim 9, wherein the grid work inhibits media telescoping.

12. An air filter cartridge according to claim 1, wherein the preform further comprises a funnel surface extending at an angle relative to the media pack.

13. An air filter cartridge according to claim 12, wherein the angle is within the range of 30° to 60°.

14. An air filter cartridge according to claim 12, wherein the angle is within the range of 35° to 55°.

15. An air filter cartridge according to claim 1, wherein:
(a) the plurality of apertures in the preform are seal flow apertures; and,
(b) the seal arrangement is molded to the seal support and extends through the seal flow apertures.

16. An air filter cartridge comprising:
(a) a media pack having a first end, a second end, and an axial length between the first end and the second end, wherein the media is closed to the flow of unfiltered air therethrough;
(b) a preform having a sidewall portion circumscribing the media pack and including a seal support, wherein the media pack is secured within the preform; and, the preform includes a plurality of apertures therethrough in a portion of the preform surrounding the media pack;
(c) a seal arrangement secured on the seal support; and
(d) the media pack has a cross section with a pair of opposite sides joined by a pair of curved opposite ends.

17. An air filter cartridge according to claim 16, wherein the preform comprises molded plastic.

18. An air filter cartridge according to claim 16, wherein the seal arrangement comprises foam polyurethane.

19. An air filter cartridge according to claim 16, wherein the preform is secured to the media pack by the seal arrangement.

20. An air filter cartridge according to claim 16, wherein the seal arrangement is constructed to provide an axial seal when in sealing engagement with an air cleaner housing.

21. An air filter cartridge according to claim 16, wherein:
(a) the media pack comprises fluted media secured to facing media and defining an inlet flow face and an outlet flow face, at the first end and second end respectively.

22. An air filter cartridge according to claim 21, wherein the media pack comprises a coiled media pack.

23. An air filter cartridge according to claim 21, wherein the preform includes a portion extending over one of the flow faces.

24. An air filter cartridge according to claim 23, wherein the preform includes a portion extending over the outlet flow face.

25. An air filter cartridge according to claim 23, wherein the portion extending over one of the flow face comprises grid work.

26. An air filter cartridge according to claim 25, wherein the grid work comprises diagonal cross pieces.

27. An air filter cartridge according to claim 25, wherein the grid work inhibits media telescoping.

28. An air filter cartridge according to claim 17, wherein the preform further comprises a funnel surface extending at an angle relative to the media pack.

29. An air filter cartridge according to claim 28, wherein the angle is within the range of 30° to 60°.

30. An air filter cartridge according to claim 28, wherein the angle is within the range of 35° to 55°.

31. An air filter cartridge according to claim 17, wherein
(a) the seal arrangement is molded to the seal support and includes portions extending through the plurality of apertures.

32. An air cleaner assembly comprising:
(a) a housing having a primary air cleaner section, and a cover;
(i) the housing being jointed between the cover and the primary air cleaner section; and,
(b) an air filter cartridge positioned within the housing; the air filter cartridge comprising:
(i) a media pack comprising a fluted media sheet secured to a facing media sheet, the media pack having an inlet flow face, an outlet flow face, and an axial length between the inlet flow face and the outlet flow face, wherein the media is closed to the flow of unfiltered air therethrough;
(ii) a preform having a sidewall portion circumscribing the media pack and including a seal support, wherein the media pack is secured within the preform; and, the preform includes a plurality of apertures therethrough in a portion of the preform surrounding the media pack;
(iii) a seal arrangement secured on the seal support; and
(iv) the media pack having a cross section with a pair of opposite sides joined by a pair of curved opposite ends.

* * * * *

UNITED STATES PATENT AND TRADEMARK OFFICE
CERTIFICATE OF CORRECTION

Page 1 of 1

PATENT NO. : 8,778,043 B2
APPLICATION NO. : 13/356205
DATED : July 15, 2014
INVENTOR(S) : Krisko et al.

It is certified that error appears in the above-identified patent and that said Letters Patent is hereby corrected as shown below:

In the Claims

Col. 22, line 13, claim 25: "over one of the flow face comprises" should read --over one of the flow faces comprises--

Signed and Sealed this
Thirty-first Day of March, 2015

Michelle K. Lee
*Director of the United States Patent and Trademark Office*